(12) United States Patent
Park

(10) Patent No.: US 8,396,907 B2
(45) Date of Patent: Mar. 12, 2013

(54) DATA PROCESSING SYSTEM AND METHOD OF GROUPING COMPUTER FILES

(75) Inventor: Sung Guk Park, Seattle, WA (US)

(73) Assignee: Sung Guk Park, Seattle, WA (US)

( * ) Notice: Subject to any disclaimer, the term of this patent is extended or adjusted under 35 U.S.C. 154(b) by 531 days.

(21) Appl. No.: 12/357,572

(22) Filed: Jan. 22, 2009

(65) Prior Publication Data

US 2009/0204646 A1 Aug. 13, 2009

Related U.S. Application Data

(60) Provisional application No. 61/028,199, filed on Feb. 13, 2008.

(51) Int. Cl.
*G06F 17/30* (2006.01)
(52) U.S. Cl. ........................ 707/822; 711/100
(58) Field of Classification Search .................. 707/822, 707/999.107, 999.205; 711/100
See application file for complete search history.

(56) References Cited

U.S. PATENT DOCUMENTS

| | | | |
|---|---|---|---|
| 6,065,010 A * | 5/2000 | Otsuka et al. ........................ | 1/1 |
| 6,944,622 B1 * | 9/2005 | Mitchell et al. ...................... | 1/1 |
| 7,343,587 B2 * | 3/2008 | Moulden et al. ............... | 717/124 |
| 7,386,535 B1 * | 6/2008 | Kalucha et al. ...................... | 1/1 |
| 7,437,358 B2 * | 10/2008 | Arrouye et al. ...................... | 1/1 |
| 7,721,216 B2 * | 5/2010 | Zaner et al. .................... | 715/758 |
| 2004/0068513 A1 * | 4/2004 | Carroll et al. ................. | 707/102 |
| 2004/0205644 A1 * | 10/2004 | Shaughnessy et al. ........ | 715/530 |
| 2005/0160107 A1 * | 7/2005 | Liang ............................. | 707/100 |
| 2007/0250784 A1 * | 10/2007 | Riley et al. .................... | 715/764 |
| 2009/0070291 A1 * | 3/2009 | Tadayon et al. .................... | 707/2 |
| 2009/0100368 A1 * | 4/2009 | Look et al. .................... | 715/775 |

* cited by examiner

*Primary Examiner* — Leslie Wong
(74) *Attorney, Agent, or Firm* — NSIP Law

(57) ABSTRACT

A method of operating multiple files includes creating a group of computer files using a single container, and opening multiple files of the group and associated application software by opening a single file corresponding to the group of computer files.

14 Claims, 23 Drawing Sheets

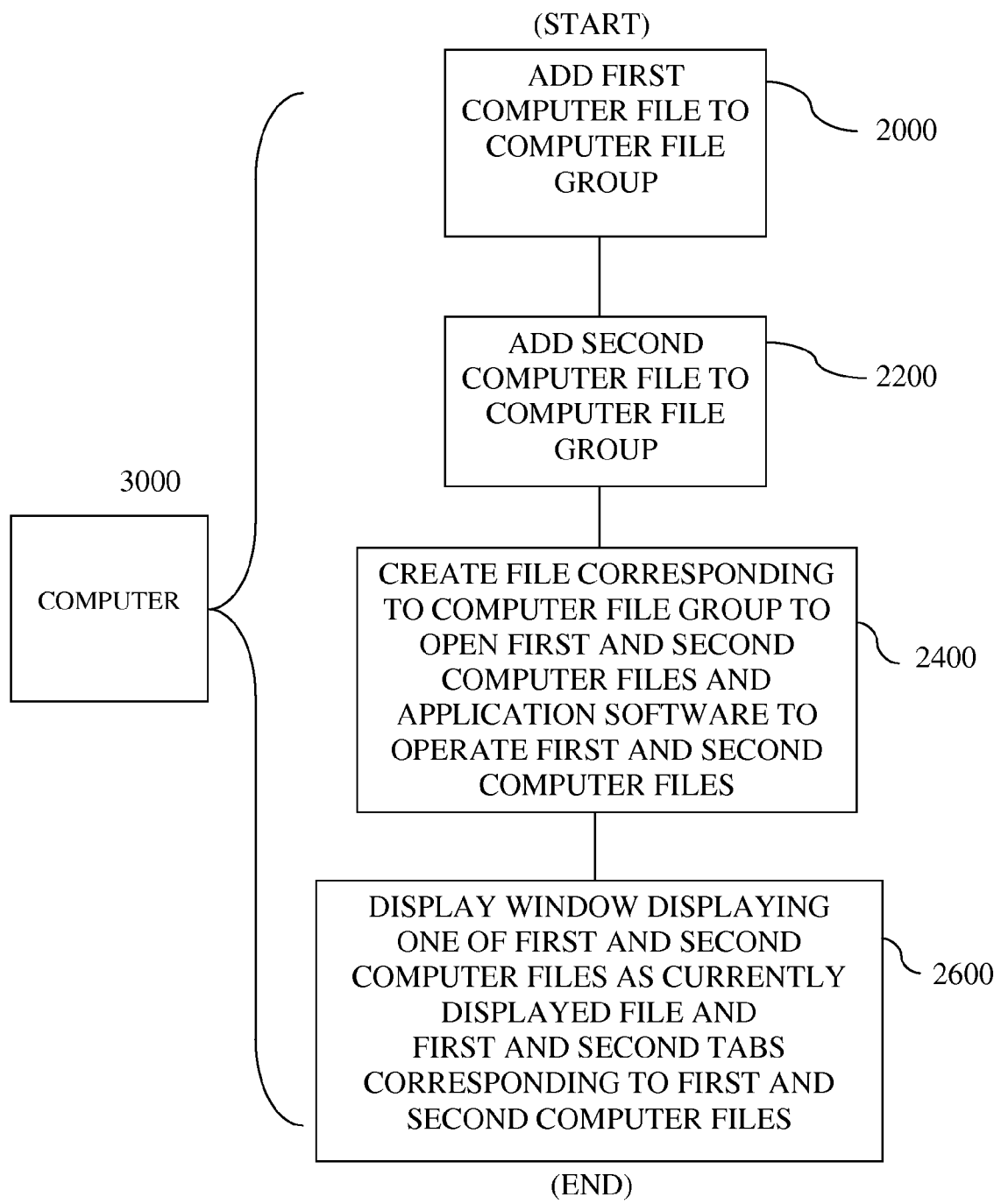

DATA PROCESSING SYSTEM AND METHOD OF GROUPING COMPUTER FILES

CROSS-REFERENCE TO RELATED APPLICATION(S)

This application claims the benefit under 35 U.S.C. §119 (e)(1) of a provisional application entitled "DATA PROCESSING SYSTEM AND METHOD OF GROUPING COMPUTER FILES" filed in the United States Patent and Trademark Office on Feb. 13, 2008 and assigned Ser. No. 61/028,199, the entire disclosure of which is hereby incorporated by reference.

TECHNICAL FIELD

The following description relates to data processing systems and, more particularly, to grouping files displayed on a data processing system.

BACKGROUND

A computer file may be described as a block of arbitrary information, or resource for storing information, which is generally available to a computer program and is usually based on some kind of durable storage. A file is durable in the sense that it remains available for programs to use after the current program has finished. Application software may be described as a subclass of computer software that generally employs the capabilities of a computer directly to a task that a user wishes to perform. System software is typically involved in integrating a computer's various capabilities, but generally does not directly apply them in the performance of tasks that benefit the user. In this context the term application may refer to both the application software and its implementation. Each computer file acts independently and is manipulated independently. A program, like an operating system or an application window, may display one or more computer files.

SUMMARY

In one general aspect, there is provided a computer file grouping system where computer files are linked and viewable in a single container.

In another general aspect, by linking individual computer files into groupings, one or more users are allowed view multiple computer files and one or more application software corresponding to the computer files, in a single container. Accordingly, one or more users may view, edit, save, delete, and add multiple computer files in the single container.

In still another general aspect, by grouping individual computer files, one or more users are allowed to easily open one computer file group to open multiple computer files and application software to operate the individual computer files.

A computer file group system may implement grouping of individual files by using a container. This container may be an application software which allows a user to, for example, create a new computer file group, open an existing computer file group, save the current computer file group, save a copy of the current computer file group, add an individual computer file to the computer file group, duplicate the individual computer file being selected and add the duplicated computer file to the computer file group and exit which terminates the application software, the individual computer files associated with the computer file group and the individual application software associated with the individual computer files.

In yet another general aspect, individual computer files are associated with multiple computer file group files. By editing the individual computer file, that individual computer file may be updated in all the computer file group the individual computer file is associated with.

A computer file group may be depicted as a file type which is recognized by an operating system with a computer file group application. A user may open the computer file group by either double clicking on an icon representing the computer file group file or by opening the computer file group application software and opening the computer file group file from the application software.

In yet another general aspect, a method in a computer system for grouping computer files in a computer file group, includes adding a first computer file selected by a user to the computer file group, adding a second computer file selected by the user to the computer file group, and creating a file corresponding to the computer file group to open the first and second computer files and application software to operate the individual first and second computer files.

The first and the second computer files may be of the same file type, the first computer file being a previous version of the second computer file.

The first and the second computer files may be of different type, and opening the file opens the first and second computer files and first and second application software that are associated with the first and second computer files to operate the first and second computer files.

The method may further include displaying a window displaying the first computer file as a currently displayed file and first and second tabs corresponding to the first and second computer files, and displaying the second computer file as the currently displayed file in response to the second tab being selected by the user.

The method may further include adding the first computer file selected by the user to another computer file group, wherein in response to updating the first computer file in the computer file group, the updated first computer file is provided in response to opening a file corresponding to the another computer file group.

In response to further updating the first computer file in the another computer file group, the further updated first computer file may be provided in response to opening the file corresponding to the computer file group.

Opening the created file corresponding to the computer file group may open all the individual first and second computer files associated with the computer file group and the corresponding application software that are associated with the individual first and second computer files.

Other features will become apparent to those skilled in the art from the following detailed description, which, taken in conjunction with the attached drawings, discloses exemplary embodiments.

BRIEF DESCRIPTION OF THE DRAWINGS

FIG. 11 is a diagram illustrating a method in a computer system for grouping computer files in a computer files group according to an exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
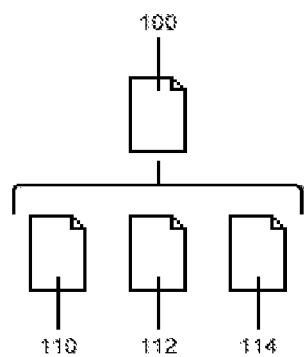
FIG. 1 is a diagram illustrating an exemplary computer file grouping.

FIG. 1 illustrates an exemplary computer file grouping. Reference numerals 110, 112, 114 are individual computer files which are grouped into one computer file 100. By opening the computer file grouping 100, all the individual computer files 110, 112, 114 associated with the computer file grouping 100 open as well as the corresponding application software the individual computer file is associated with. This reduces the complexity of organizing individual computer files.

Figure 2A:
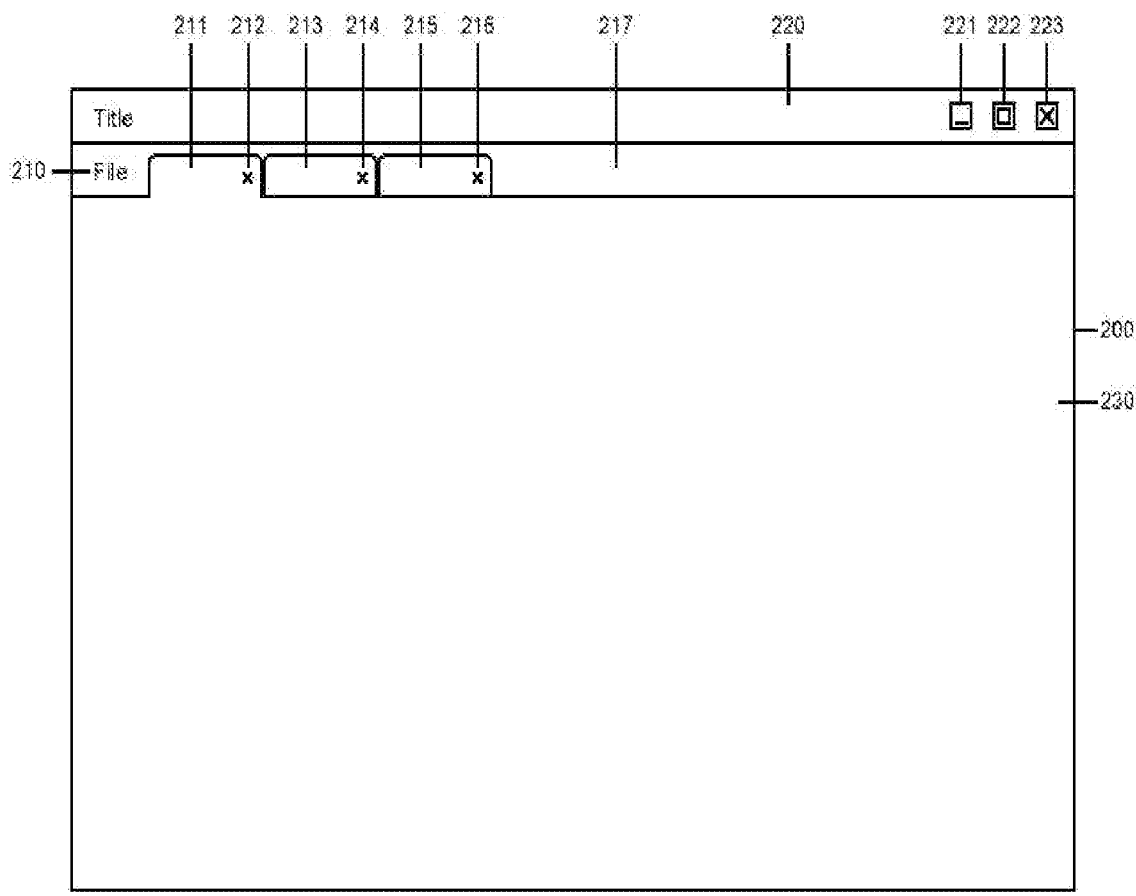
FIGS. 2A and 2B are diagrams illustrating an exemplary container, for example, an application software, to show how a computer file grouping is implemented according to an embodiment.

FIG. 2A illustrates an application software to which an exemplary computer file grouping is implemented. Reference numeral 200 depicts, for example, a conventional window. Reference numeral 230 depicts a display window which shows the selected individual file and the associated application software. Reference numeral 210 indicates a drop down which exposes options to a user. As an illustration, the options include New, Open, Save, Save As, Add File, Duplicate File and Exit. Each of these will be explained in detail with reference to FIG. 2B. Reference numerals 211, 213, and 215 refer to individual computer file associated with the current computer file grouping. This area displays a computer file type icon and computer file name. For example, by clicking 211, 213, and 215, the display area 230 changes to display the individual computer file clicked as well as the corresponding application software associated with that individual computer file. An embodiment will be discussed in detail with reference to FIGS. 6A through 6C. Tabs corresponding to 211, 213, and 215 may also be used to reorder the sequence in which the individual computer files are displayed. By holding down on one of the tabs 211, 213, and 215, and moving it in a different order, the sequence in which the computer file is displayed may be re-ordered. An embodiment will be discussed in detail with reference to FIGS. 7A through 7D. Button 212, 214, and 216 may be used to close the individual computer file associated with the current computer file grouping. By clicking on a button 212, 214, or 216, the individual computer file and the application software associated with that individual computer file may terminate and no longer associate with the computer file grouping. An embodiment will be discussed in detail with reference to FIGS. 5A through 5C.

Reference numeral 217 depicts an area where individual computer files may be displayed in tabs. Reference numeral 220 depicts a title bar that displays meaningful information, like a title, to a user so that the user can identify the purpose of the window. The title bar 220 has a number of buttons 221, 222, 223. For example, the button 223 is used to close the window which terminates all the individual computer files associated with the computer file grouping and all the application software the individual computer files are associated with. Button 222 is used to enlarge the window so that it covers more of the video screen. After being enlarged to cover the entire screen of the video display, the button 222 may be activated again to return the window to its original size. Where the button 222 is used in this capacity, it may be referred to as a "restore" button. Button 221 is used to minimize the representation of the window 200. The phrase "minimizing the window" may refer to representing the window in a manner which is not fully functional, like representing the window as an icon or as a button. Once minimized, double-clicking on the icon maximizes the window 200 into a fully-functional representation of the window.

Figure 2B:
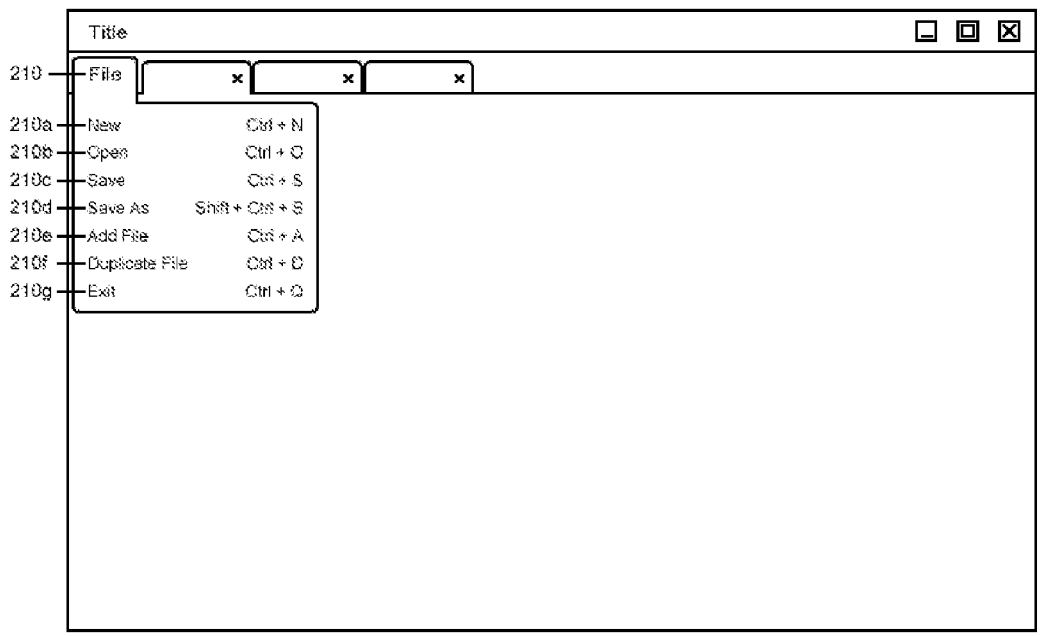

FIG. 2B illustrates an application software to which an exemplary computer file grouping is implemented, in particular, showing details of the File drop down. For example, by clicking on the tab 210, the drop down exposes additional options under the tab 210. As an illustration, the options include, but are not limited to: New 210a, which creates a new computer file grouping; Open 210b, which opens an existing computer file grouping; Save 210c which saves a current computer file grouping, and where a computer file grouping file exists, replaces it with the current computer file grouping; Save As 210d which saves a copy of a computer file grouping; Add File 210e which adds an individual computer file to a computer file grouping creating a new tab to depict the individual computer file and the corresponding application software associated with the individual computer file; and Duplicate File 210f which duplicates a selected individual computer file in a computer file grouping. Where no individual computer file is selected, for example, in the instance of a new computer file grouping which does not have any individual computer files added to it, this option may be inactive. The options may further include Exit 210g which terminates a computer file grouping application and all individual files associated with the computer file grouping and the application software which are associated with the individual computer files. Where changes have been made or where the computer file grouping has not been saved, a save dialog may open prompting a user with an option to save the computer file grouping before exiting.

Where a user is working on a project, it may involve working with multiple individual computer files which are associated with the project. Organizing these individual computer files may be done by placing these computer files into a folder. In computing, a directory, catalog or folder may be an entity in a file system which contains a group of files and/or other directories. A typical file system may contain thousands (or even hundreds of thousands) of directories. Files may be kept organized by storing related files in the same directory. A directory contained inside another directory may be called a subdirectory of that directory. Together, the directories may form a hierarchy, or tree structure. Currently, in order to work with these individual computer files, the user has to open each individual computer file which opens the application software associated with the individual computer file. This creates complexity in organizing individual computer files to an associated project, and trying to locate the individual computer files may also become complex.

According to embodiments disclosed herein, for example, by creating a computer file grouping, for example, by providing multiple individual files as a group, a user may open one computer file group file and open all the associated individual files associated with the computer file group and the corresponding application software that are associated with the individual computer files. This reduces complexity and improves productivity of the user. The following are illustrative aspects, features and/or embodiments.

Versioning: Allowing multiple versions of the same computer file to be saved into a single computer file group, allowing user(s) to quickly view the iteration/changes the computer file has taken.

Grouping by Project: Allowing different computer files to be grouped by project. A given project may use various computer file types such as, but not limited to, Microsoft® Word®, Microsoft® Excel®, Microsoft® Visio®, Adobe® Photoshop® and so on. Grouping all these individual computer files allow user(s) to find, view, edit, save these individual files easily and quickly.

Grouping by Type: Because individual computer files may exist in multiple computer file groupings only one computer file needs to be updated for it to be updated in the various computer file grouping. For example, a budget computer file may is associated to a project computer file grouping as well as a financial computer file grouping. By changing an individual computer file in one computer file group, for example, the project computer file grouping, it will update that individual computer file wherever that individual computer file is associated in other computer file groupings, for example, in the financial computer file grouping.

One Computer File Group: Because multiple computer files may be associated to a single computer file group, a user can easily open just the one computer file group to open all the computer files associated with that one computer file group and the associated application software corresponding to the computer files. This allows for reduced complexity in organizing the individual computer files into folders and improves productivity of the user.

Sharing: Because individual computer files may exist in multiple computer file groupings, user(s) may easily share and collaborate on individual files. An example of this is an accountant working on a computer file group "finances" which contains an individual computer file using Microsoft® Excel®. The accountant may update this computer file. This individual computer file may also exist in another computer file group, for example, "project," being used by a project manager who may view the updates made by the accountant. Accordingly, an individual computer file may be accessed and edited by multiple users in, for example, different locations.

Controlling Order of Individual Computer Files: Because a user may control the order in which individual computer files are displayed in a computer file group, the user may easily share the individual computer files in the sequence the user wants to display the individual computer files.

An exemplary method of adding computer files will now be described.

Figure 3A:
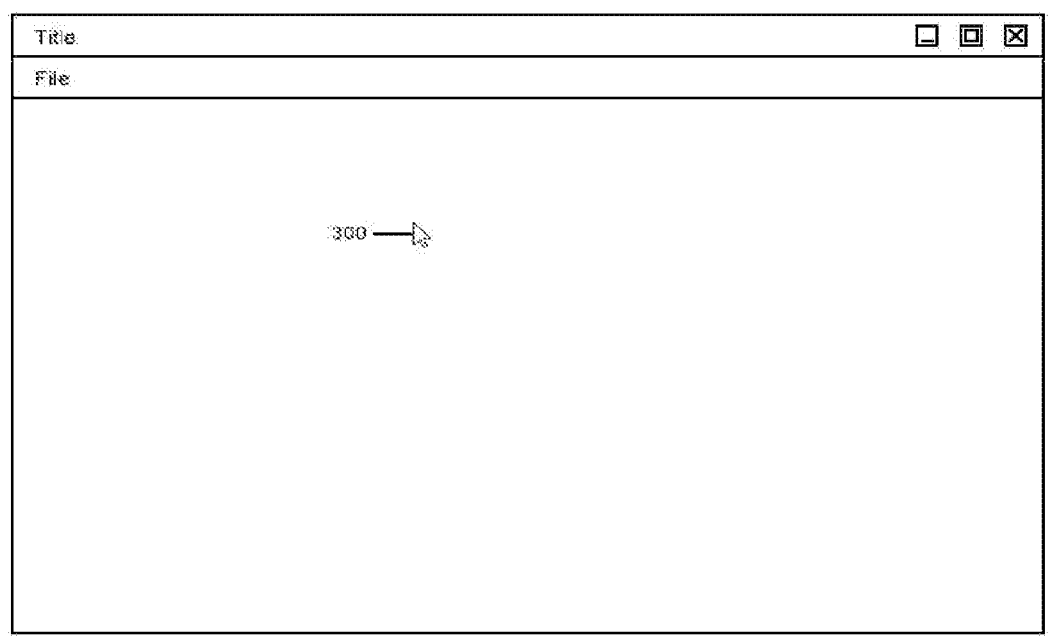
FIGS. 3A through 3G are diagrams illustrating an exemplary method of adding individual computer files by an application software to create a computer file grouping using an "Add File" from a "File" drop down.

FIG. 3A illustrates an exemplary view of a computer file grouping file. A cursor 300 may be controlled by a user using, for example, a mouse.

Figure 3B:
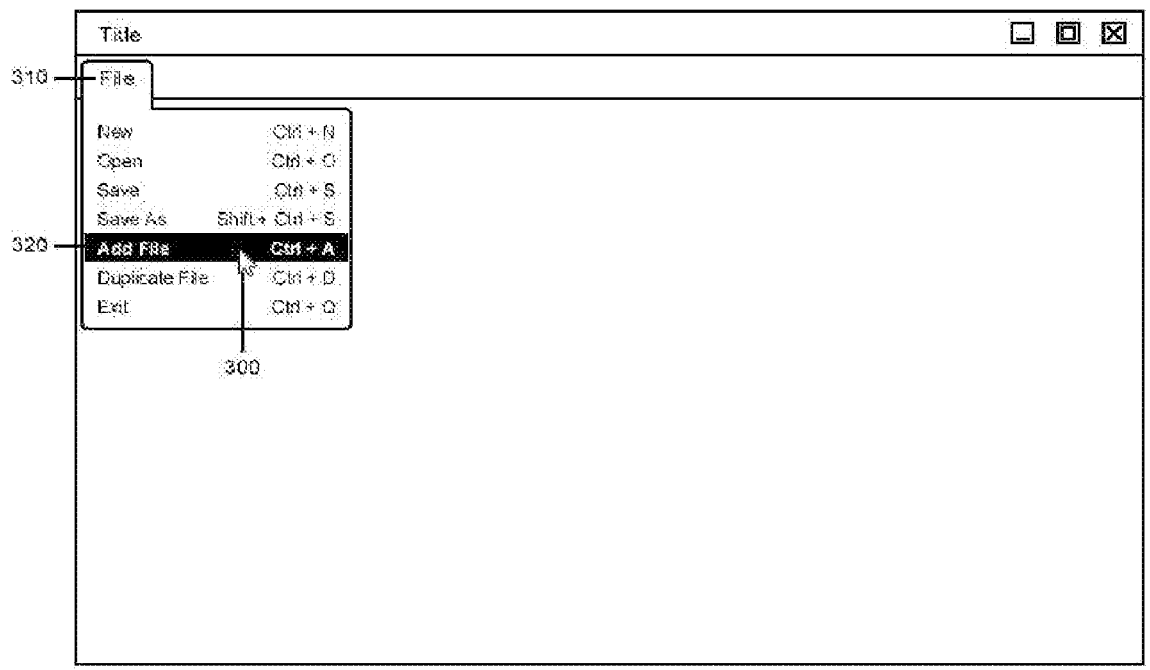
Figure 3C:
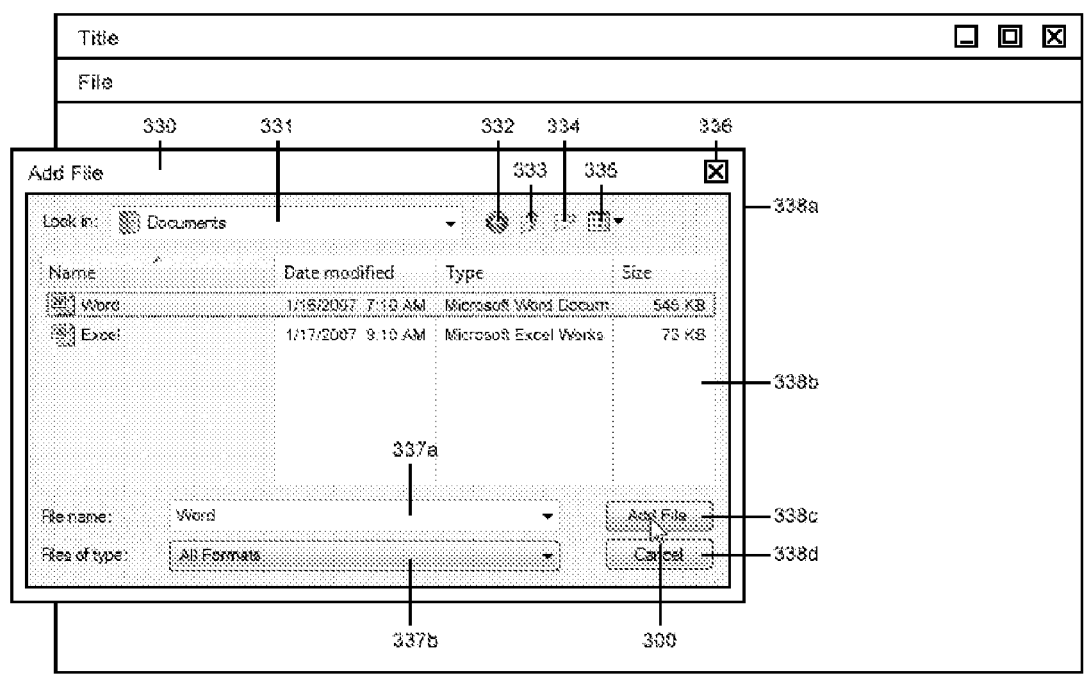

FIG. 3B illustrates moving the cursor 300 and clicking on a "File" 310 and then clicking on an "Add File" 320 in an application software. By doing so, a user may bring up an "Add File" dialog box 338a, further illustrated in FIG. 3C, which is a window allowing the user to browse a storage, for example, a hard drive, to find a desired computer file to add. FIG. 3C illustrates the "Add File" dialog box 338a in detail. Reference numeral 330 depicts a title bar with meaningful information, for example, a close button 336 to close the "Add File" dialog box 338a, a text drop down box 331 to show a file location, a button 332 button to navigate back, a button 333 to go up a level in a directory, a button 334 to create a new folder (or directory) in the current directory, a drop down 335 to expose, for example, viewing options of a Thumbnail, Tiles, Icons, List and Details. The "Add File" dialog box 338a may further include a viewing window 338b. A text drop down box 337a may display the file name of the file being selected to be added. A drop down 337b may controls what type of file formats to display in the current view 338b. A default may be "All Formats" which displays all computer file formats a computer system is capable of displaying. A button 339a may be used to add the computer file selected, and a button 339b may be used to close the "Add File" dialog box 338a, for example, without adding a computer file.

Figure 3D:
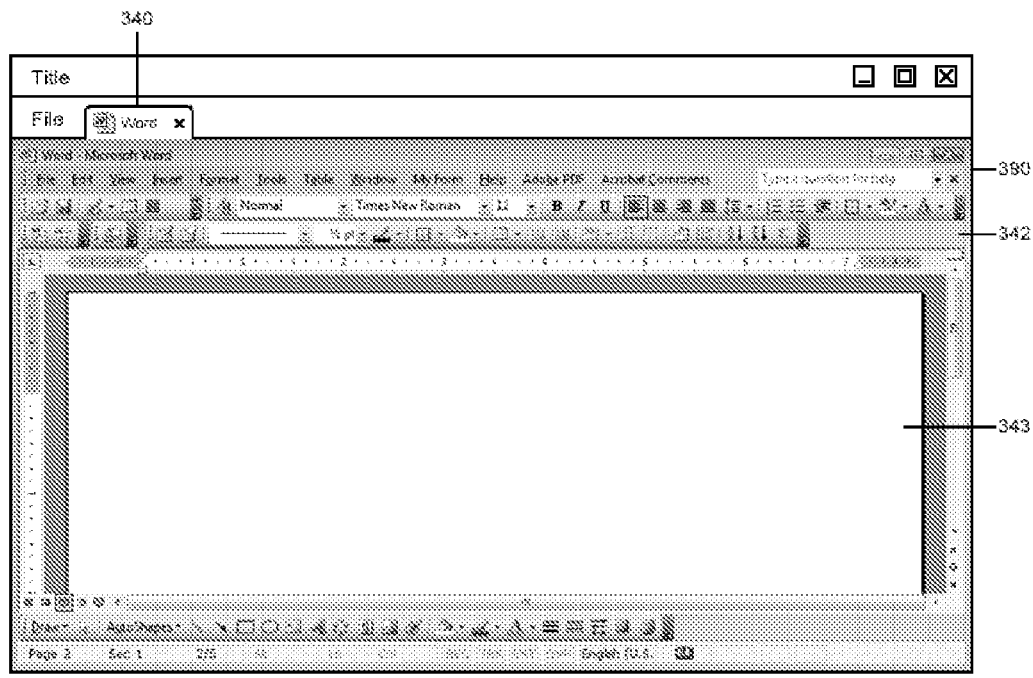

FIG. 3D illustrates an exemplary application software 390 with a "Word" computer file. For example, application software Microsoft® Word® 342 is the program associated with a computer file 343 that is added. A tab 340 indicates that the application software 390 is provided with the computer file 343 and the corresponding application software 342.

Figure 3E:
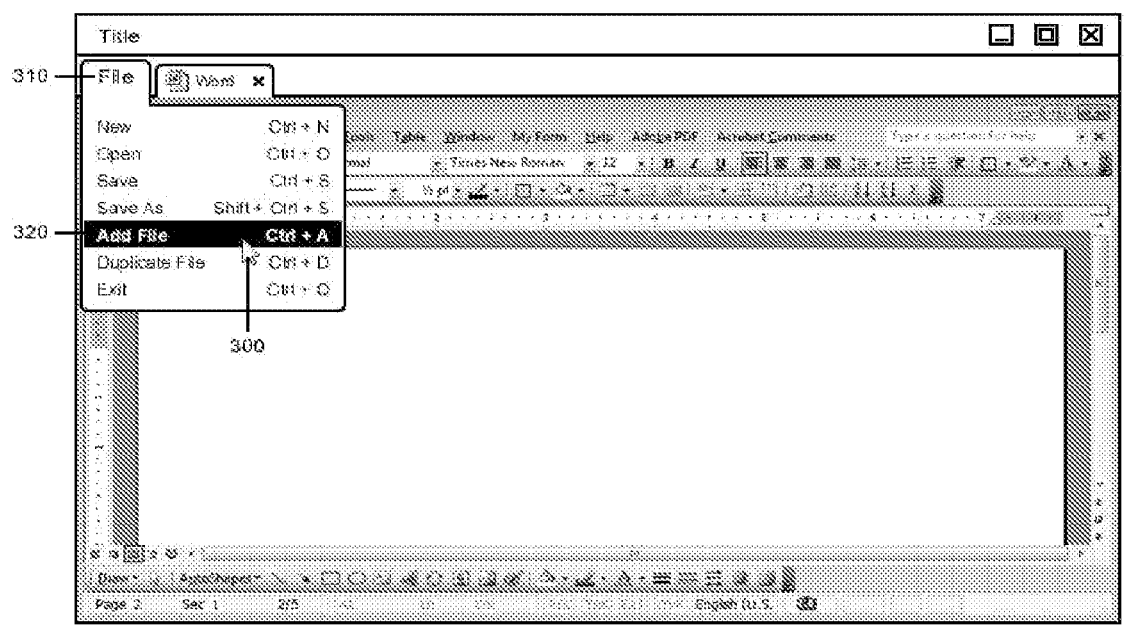
Figure 3F:
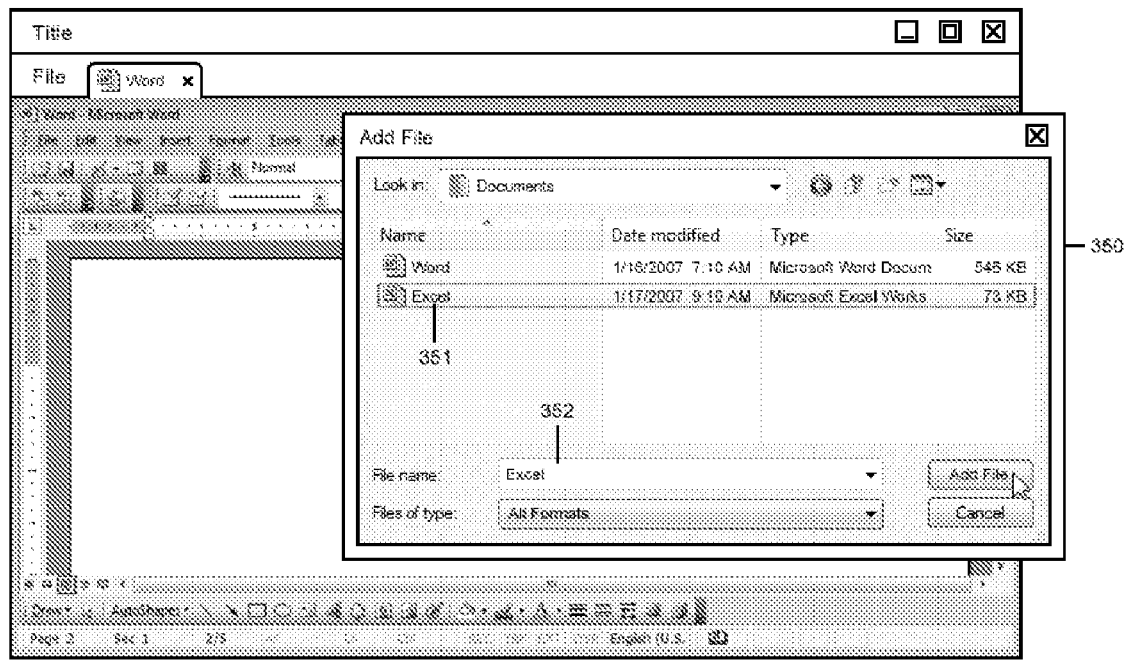

FIG. 3E further illustrates selecting of the "File" 310 and selecting the "Add File" 320 in the application software. By doing, a user may bring up an "Add File" dialog which is a window allowing the user to browse a storage to find a desired computer file to add. FIG. 3F illustrates the "Add File" dialog 350 brought about in FIG. 3E. Reference numeral 351 refers to a computer file the user has selected to add and a text drop down 352 may display the file name of the selected computer file.

Figure 3G:
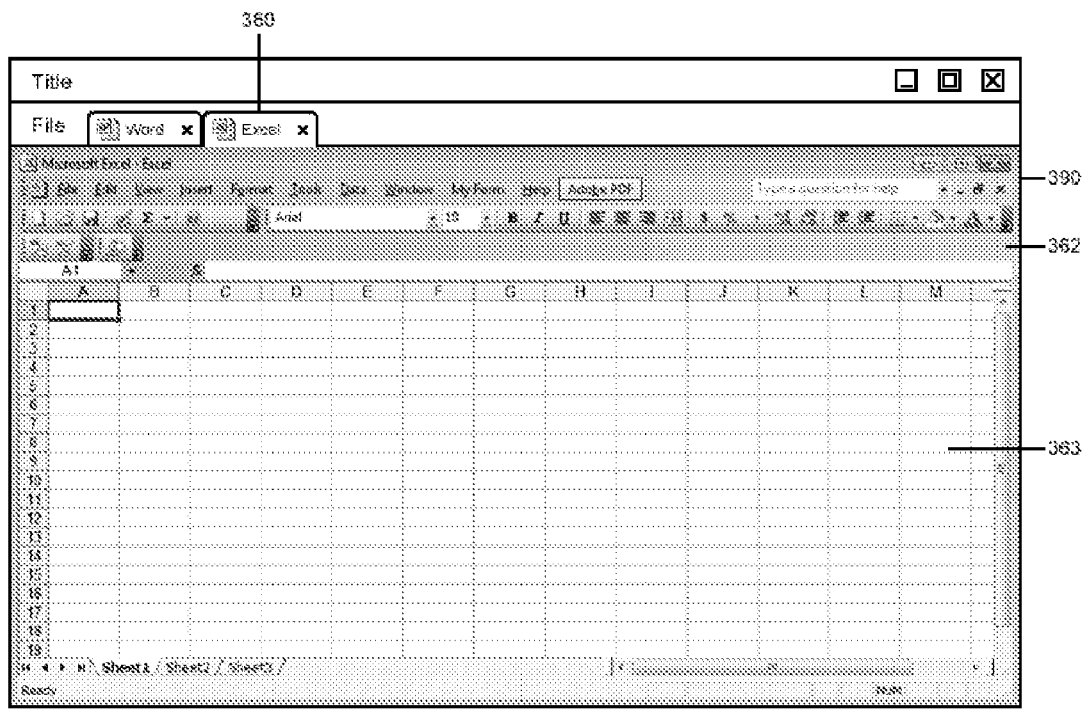

FIG. 3G further illustrates the application software 390 with an "Excel" computer file added. For example, application software Microsoft® Excel® 362 is the program associated with a computer file 363 that is added. A tab 340 indicates that the application software 390 is further provided with the computer file 363 and the corresponding application software 362.

Another exemplary method of adding or grouping computer files will now be described.

Figure 4A:
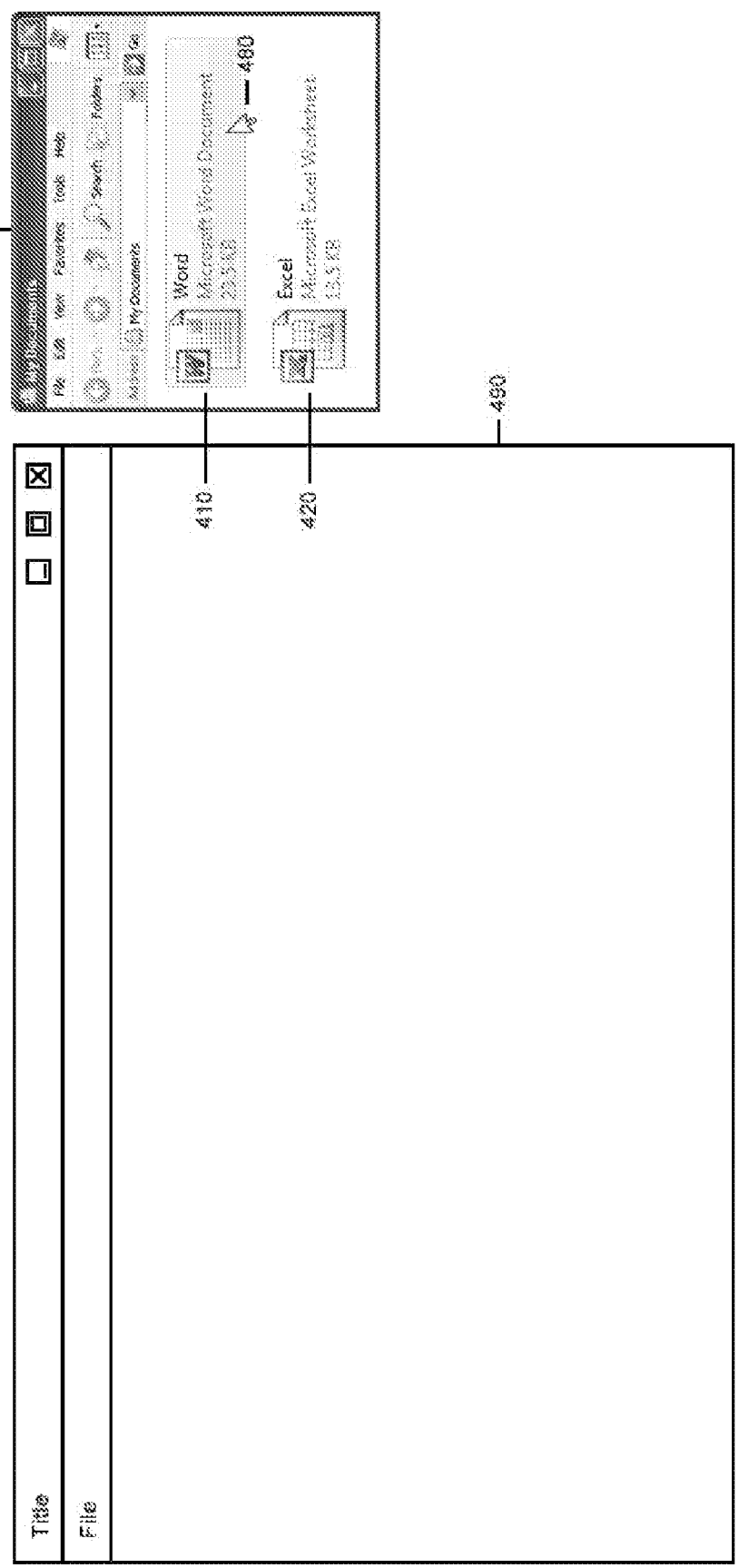
FIG. 4A through 4F are diagrams illustrating an exemplary method of adding individual computer files by an application software to create a computer file grouping using a "Drag and Drop" of an individual computer file from an operating system directory, such as Microsoft® Windows®, into the application software.

FIG. 4A illustrates an exemplary application software 490 for implementing a computer file grouping. As shown in FIG. 4A, a computer operating system directory 400, for example, Microsoft® Windows®, displays two computer file 410 and 420. The file 410 is a computer file associated with, for example, Microsoft® Word®, and the file 420 is a computer file associated with, for example, Microsoft® Excel®. Reference numeral 480 refers to a cursor 430.

Figure 4B:
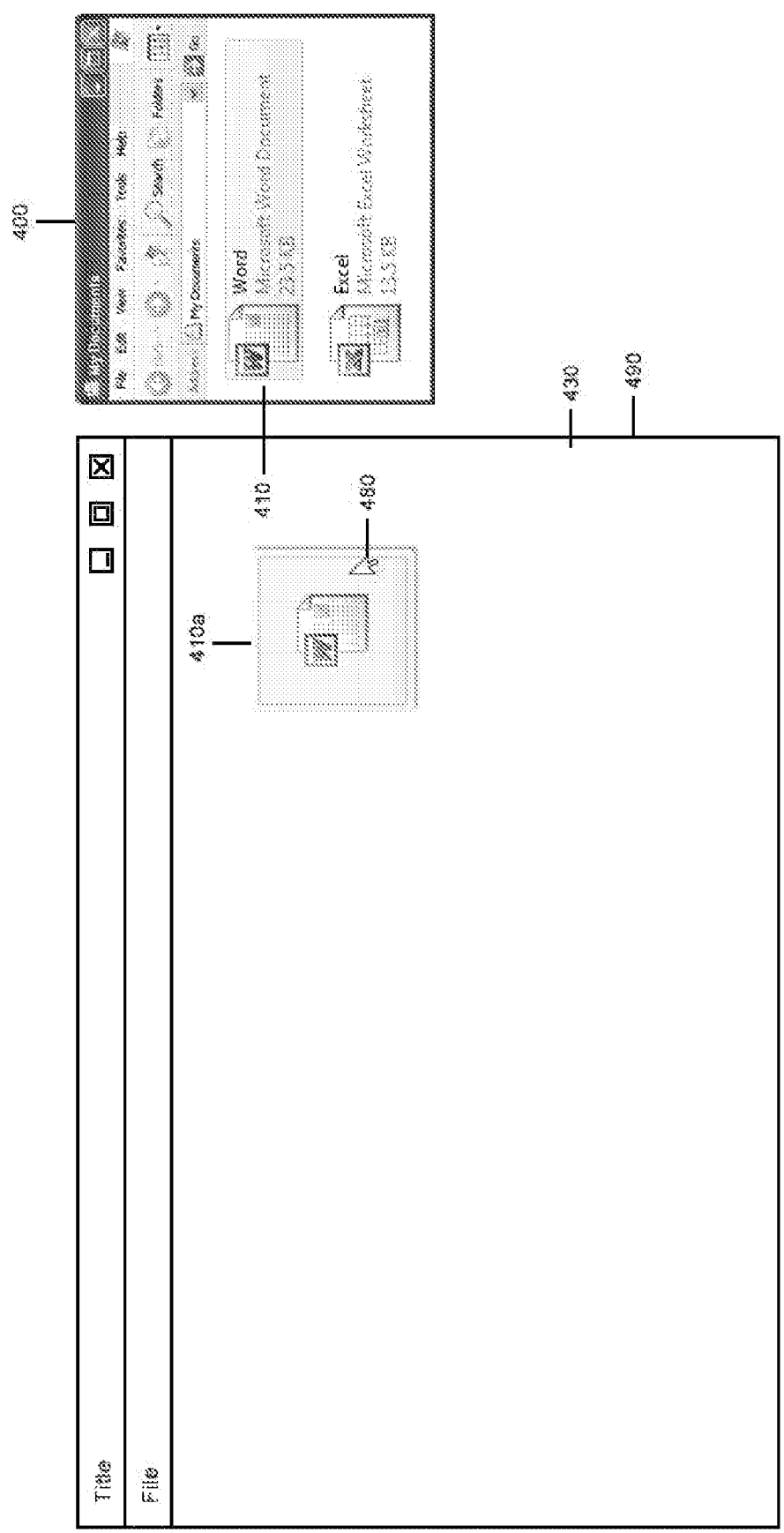

FIG. 4B further illustrates an exemplary file 410a corresponding to the file 410, in what one skilled in the art may refer as in ghost form, as it is selected and dragged. That is, using the cursor 480, a user may select the file 410 by clicking on the file 410, and drag the file 410 from the directory 400 by holding down a button of a mouse controlling the cursor 480. Once the file 410a is dragged to a window 430 of the application software 390 and the button is released, the file 410 is added to the application software 490. This operation may be referred to as "Drag and Drop."

Figure 4C:
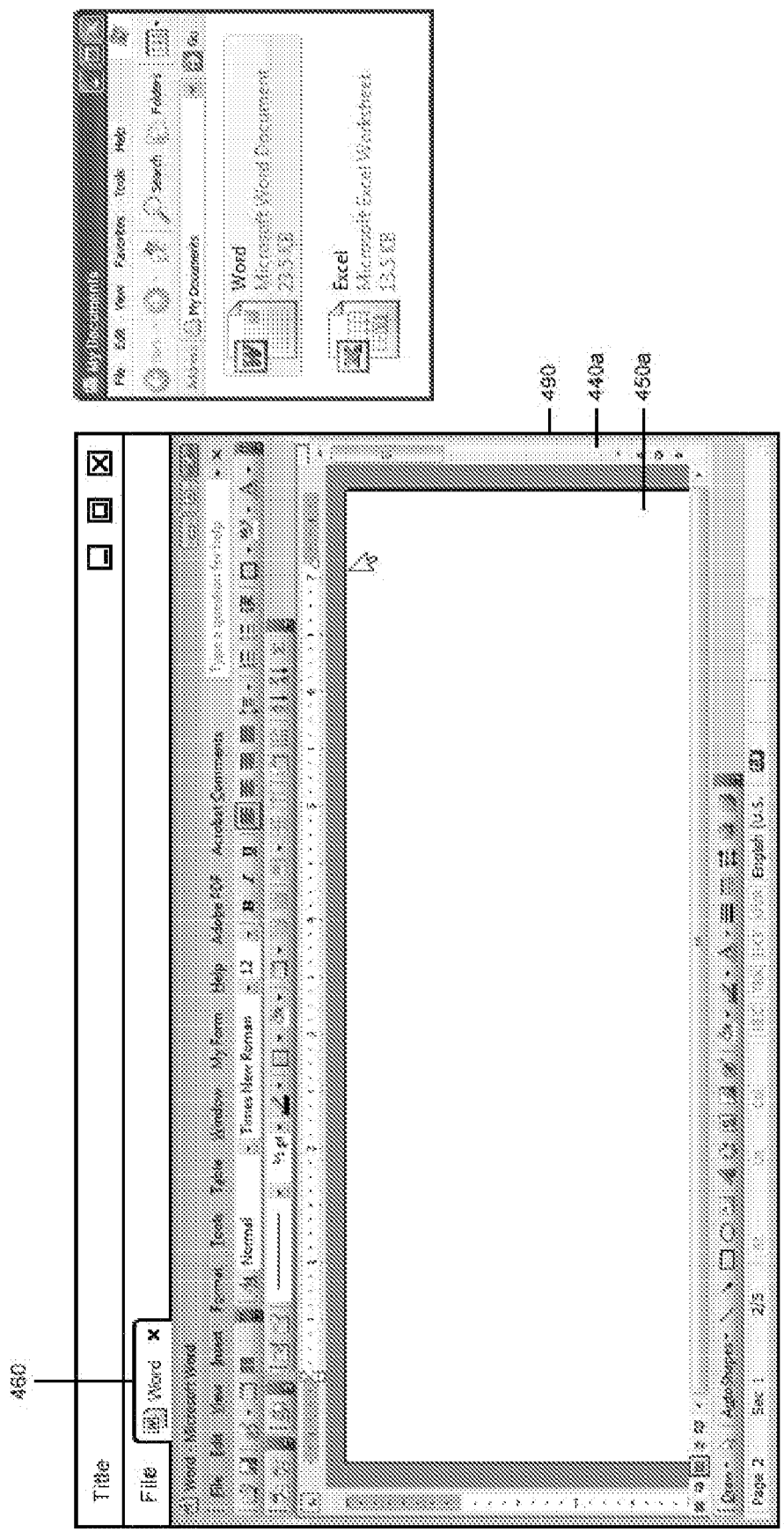
Figure 4D:
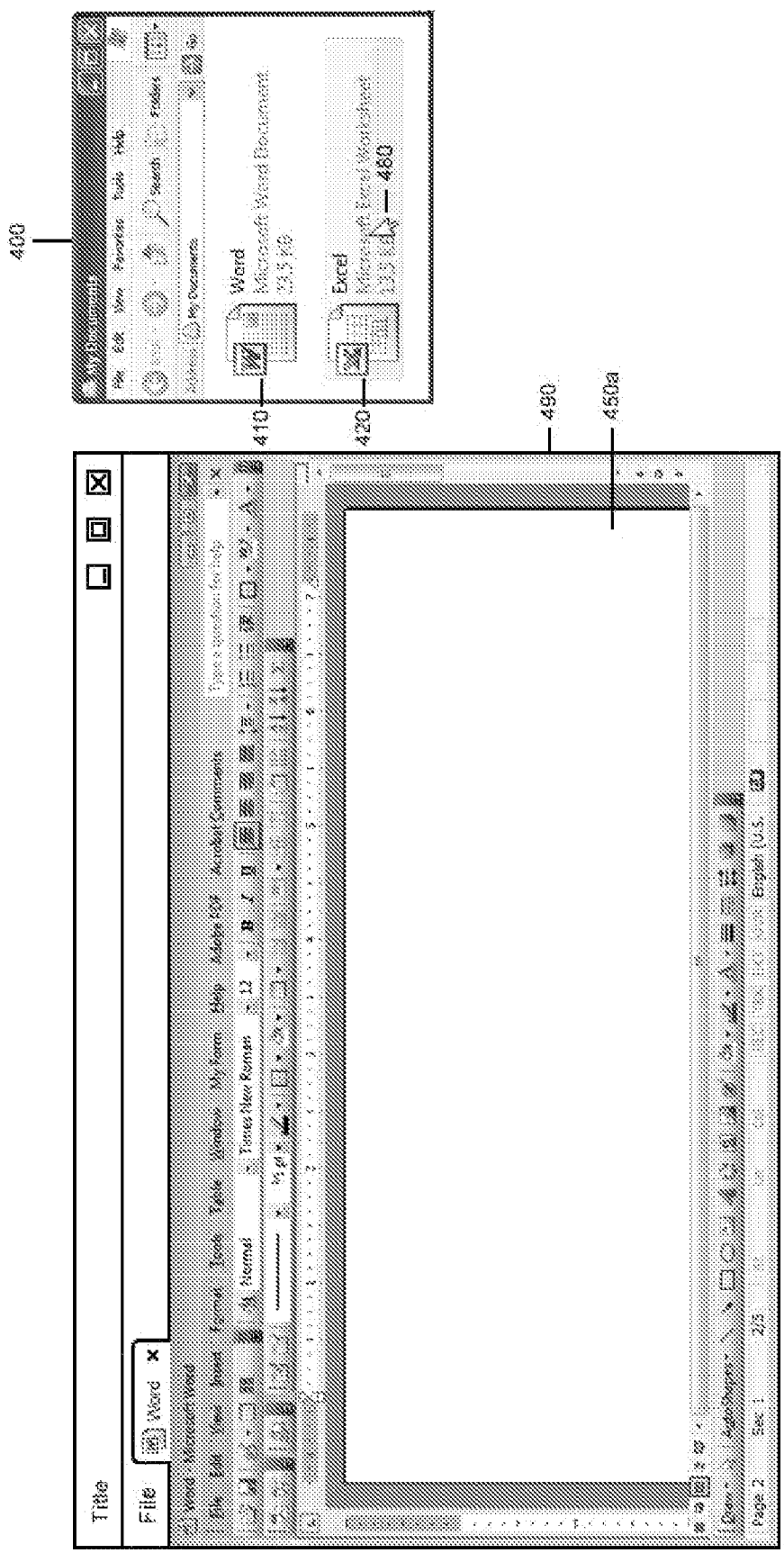

FIG. 4C illustrates the application software 490 with a computer file 450a, for example, a "Word" filed added. This may illustrate the result of the operation described with respect to FIG. 4B. Reference numeral 440a indicates that the program associated with the computer file 450a added is, for example, application software Microsoft® Word®. A tab 460 indicates that the computer file 450a and the corresponding application software 440a have been added to the application software 490. FIG. 4D illustrates selection of the file 420 using the cursor 480 to group the selected file 420 with the file 450a using the application software 490.

Figure 4E:
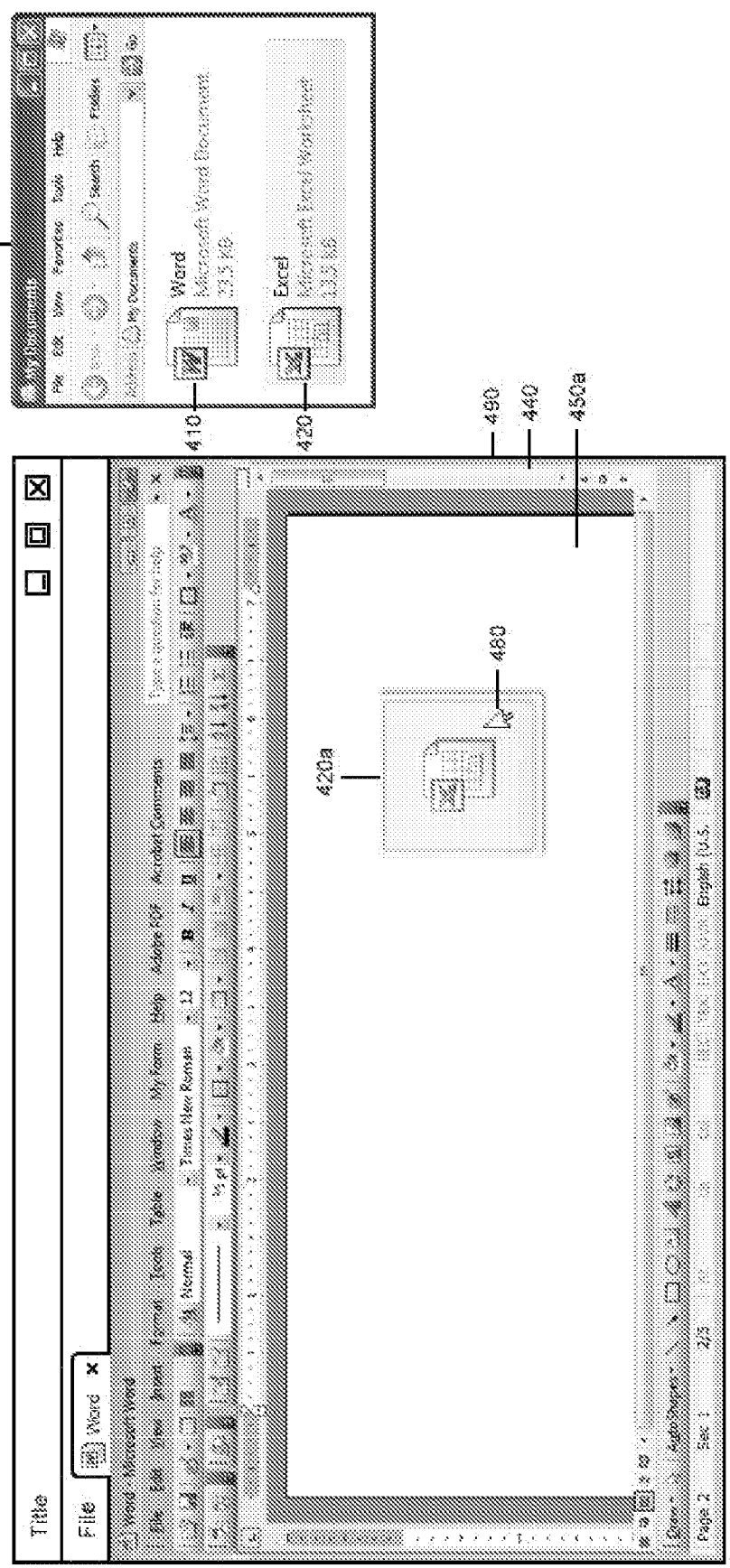

FIG. 4E illustrates a file 420a corresponding to the file 420 in ghost form, as it is selected and dragged. That is, similar to the operation described with respect to FIG. 4B, using the cursor 480, the user may select the file 420 and drag the file 420 from the directory 400 to the application software 390. Accordingly, the file 420 is added to the application software 490 having the file 450a corresponding to the file 410 of the directory 400.

Figure 4F:
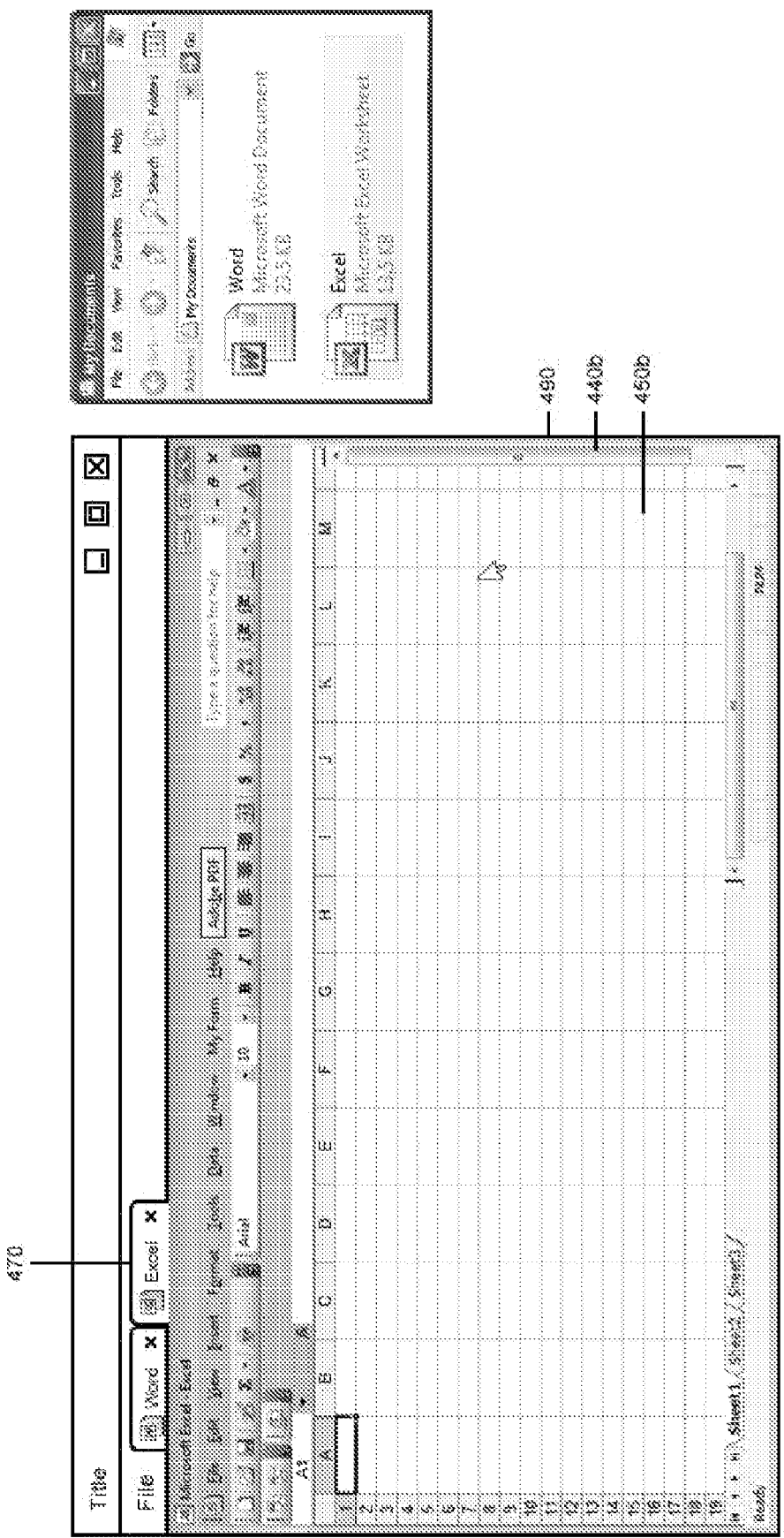

FIG. 4F illustrates the application software 490 with a computer file, for example, an "Excel" file 450b added. This may illustrate the result of the operation described with respect to FIG. 4E. Reference numeral 440b indicates that the program associated with the computer file 450b added is, for example, application software Microsoft® Excel®. A tab 470 indicates that the computer file 450b and the corresponding application software 440b have been further added to the application software 490.

It is understood that a computer file of application software may be removed or copied to another directory, group or application software by similarly selecting and dragging the computer file to the destination.

An exemplary method of removing or closing a computer file will now be described.

Figure 5A:
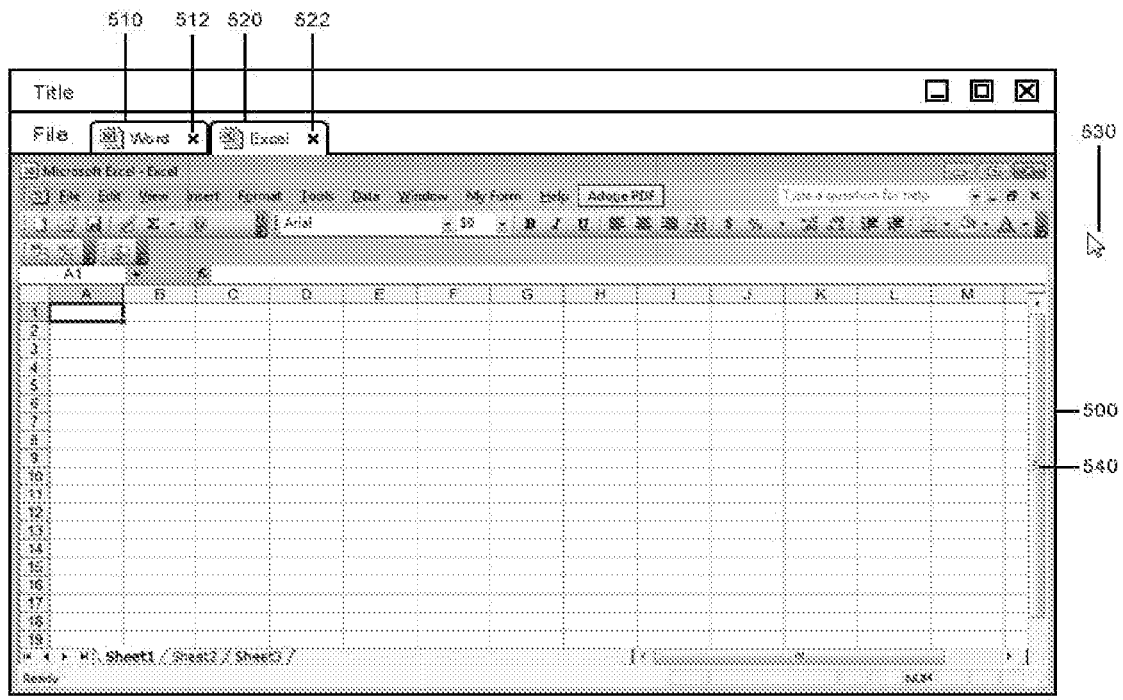
FIG. 5A through 5C are diagrams illustrating an exemplary method of removing an individual computer file from a computer file grouping in an application software.
Figure 5B:
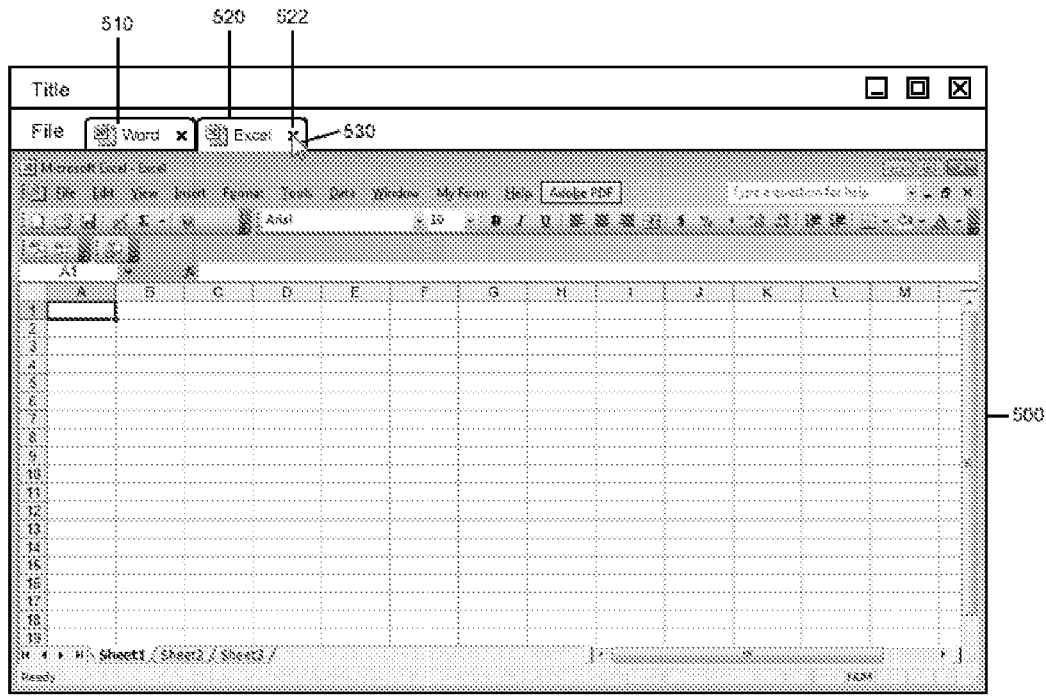
Figure 5C:
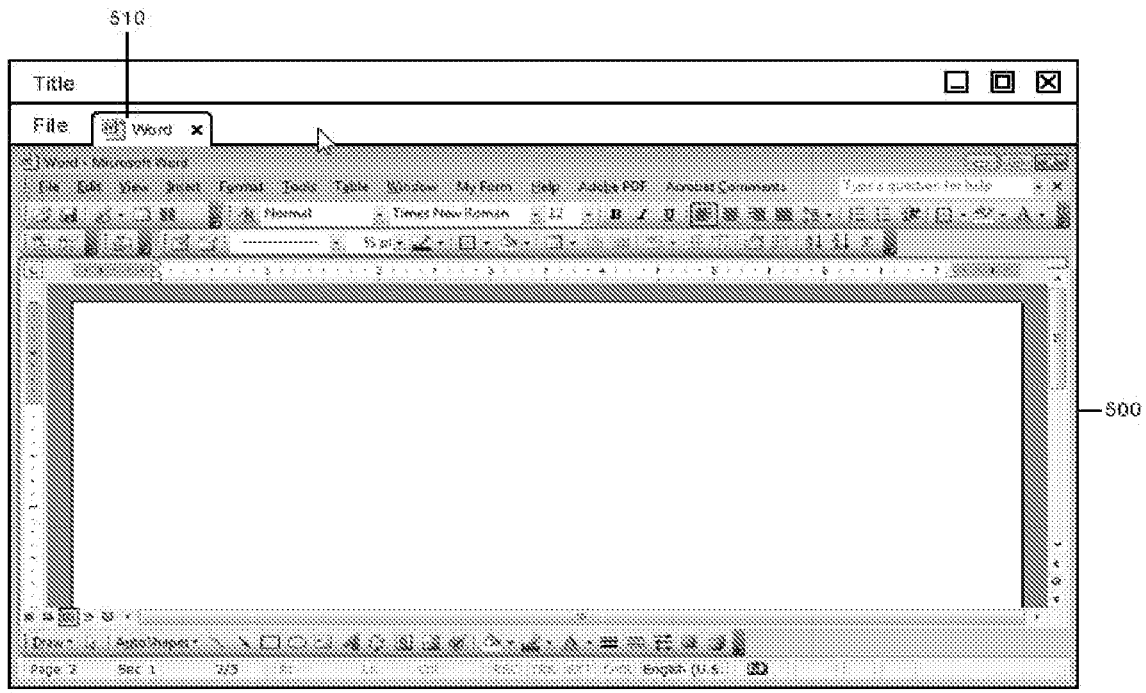

FIG. 5A illustrates an exemplary application software 500 for implementing a computer file grouping. Reference numeral 540 refers to a display area of the application software 500 application software. Reference numeral 530 refers to a cursor. A tab 510 illustrates a computer file added to the 500 application software, and a corresponding button 512 may be provided to remove or close the computer file indicated by the tab 510 from the application software 500. A tab 520 illustrates another computer file added to the application software 500, and a corresponding button 522 may be provided to remove or close this file from the from the application software 500. As shown in FIG. 5A, two computer files are added to the application software 500, operable via the corresponding application software Microsoft® Word® and Microsoft® Excel®. As shown in FIG. 5B, the cursor 530 may remove or close the file corresponding to the tab 520 and the application software Microsoft® Excel® by clicking on the button 522. FIG. 5C illustrates the application software 500 with the remaining computer file corresponding to the tab 510. As shown in FIG. 5C, in this example, the remaining file and the corresponding application software, Microsoft® Word®, remain operable with respect to the application software 500.

An exemplary method to switch viewing of one computer file to another computer file will now be described.

Figure 6A:
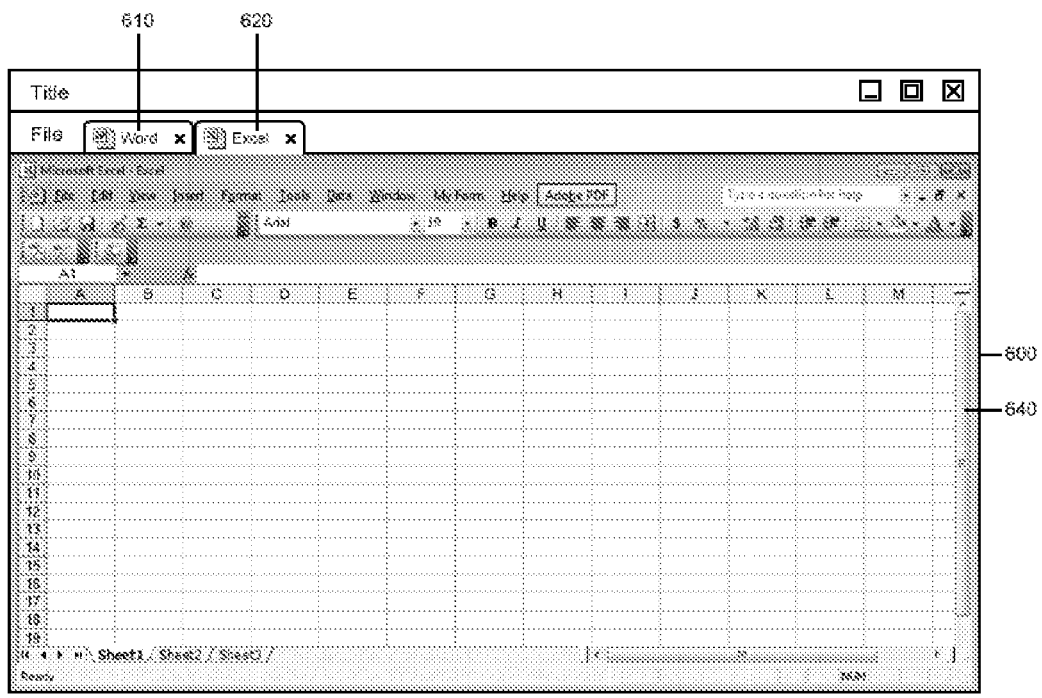
FIG. 6A through 6C are diagrams illustrating an exemplary method of switching from one individual computer file to another individual computer file and displaying an individual computer file and an application software associated with the individual computer file in a display area.
Figure 6B:
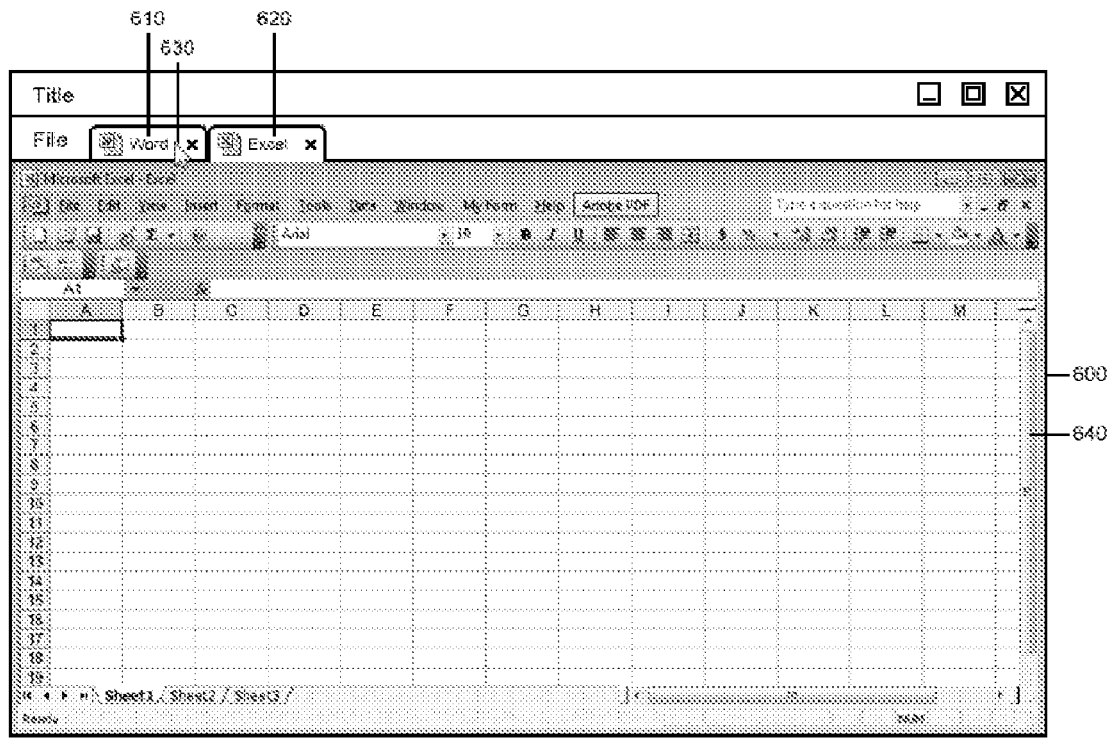
Figure 6C:
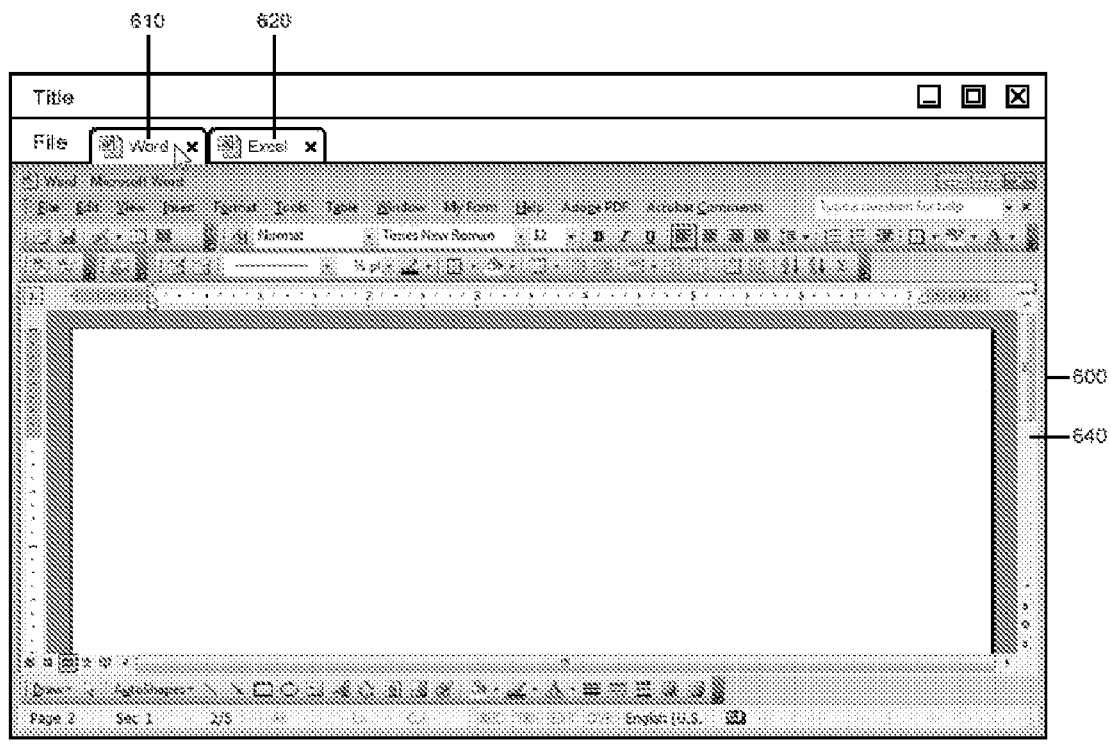

FIG. 6A illustrates an exemplary application software 600 with two computer files as indicated by tabs 610 and 620. Currently viewed file corresponding to the tab 620 is displayed in a display area 640 of the application software 600. While not indicated with reference numerals, also displayed are various information, buttons and/or drop downs to perform an operation with respect to the file currently displayed using the corresponding application software, for example, Microsoft® Excel®. As shown in FIG. 6B, a cursor 630 may select the tab 610 to view the file corresponding to the tab 610. FIG. 6C illustrates that the file corresponding to the tab 610 is displayed in the display area 640 of the application software 600. Accordingly, a user may quickly access one file from another and/or one application software from another.

An exemplary method of rearranging computer files will now be described.

Figure 7A:
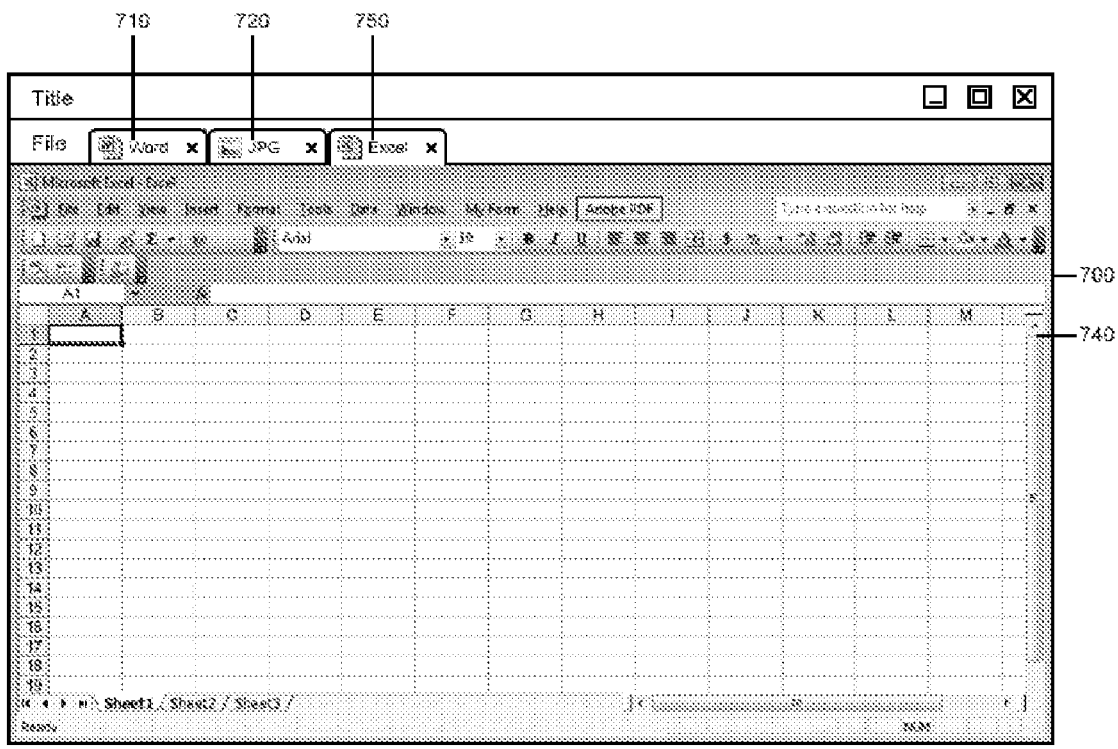
FIG. 7A through 7D are diagrams illustrating an exemplary method of re-ordering the sequence in which individual computer files are displayed in an application software.
Figure 7B:
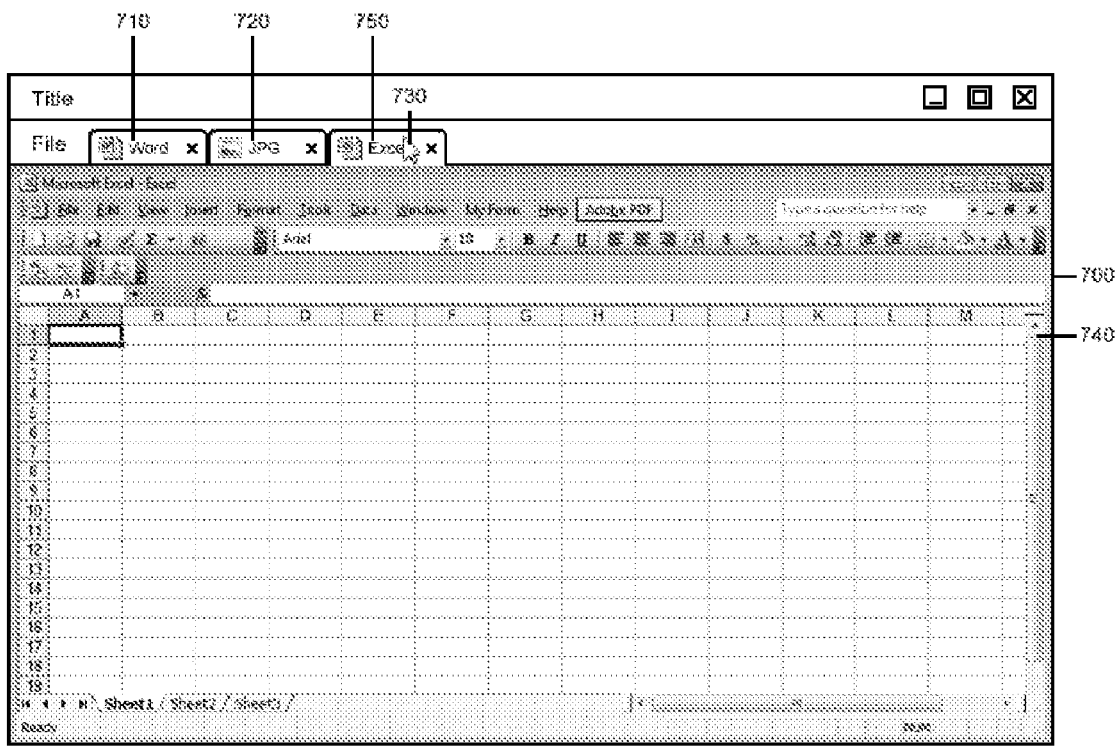
Figure 7C:
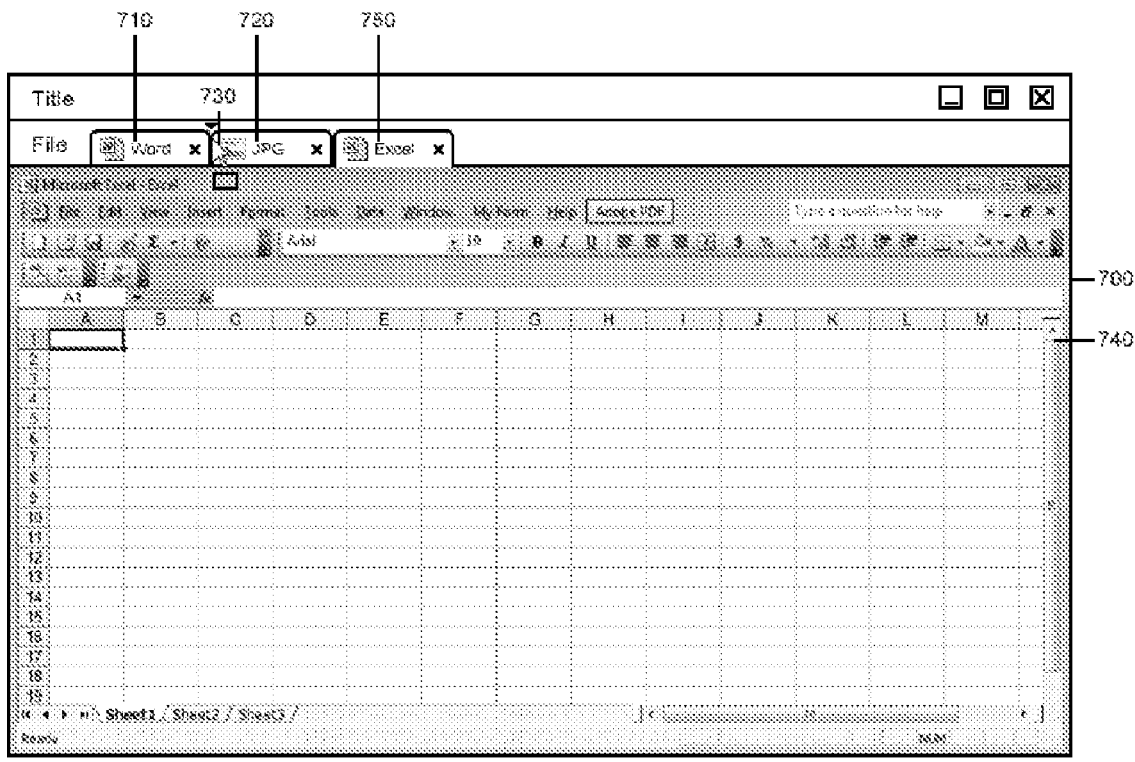
Figure 7D:
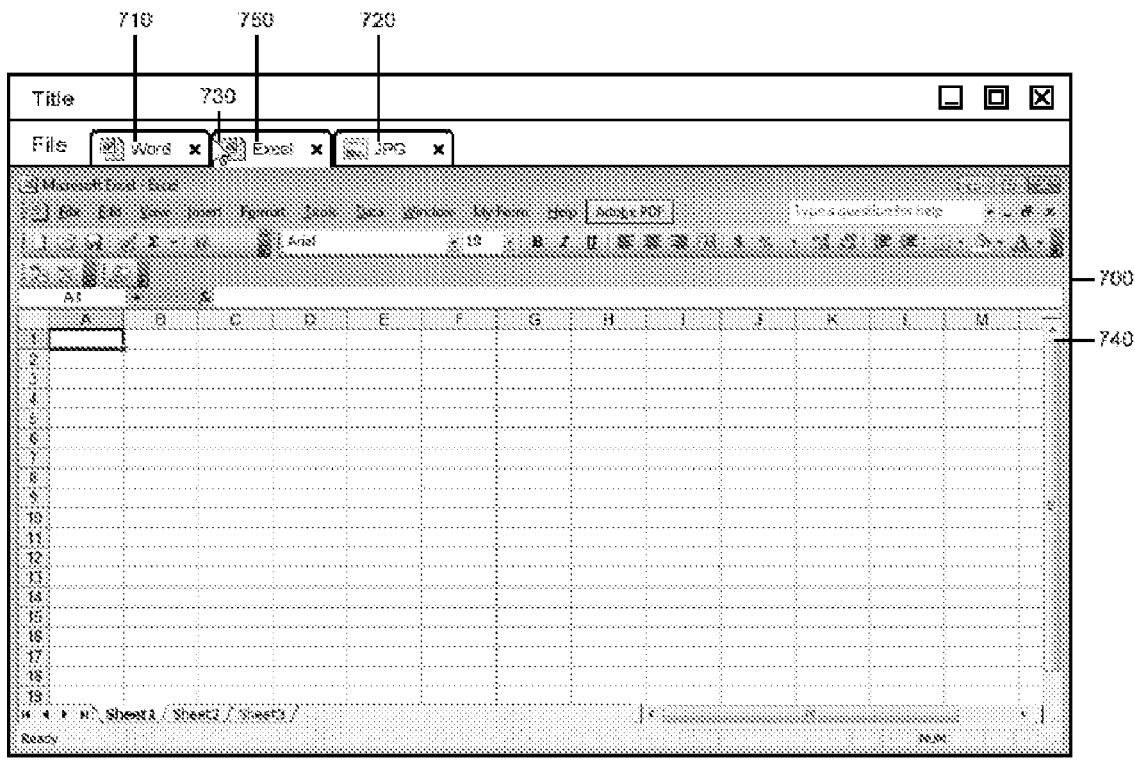

FIG. 7A illustrates an exemplary application software 700 with three computer files as indicated by tabs 710, 720, and 750. Currently viewed file corresponding to the tab 750 is displayed in a display area 740 of the application software 700. The display area 740 displays the currently viewed file and the corresponding application software to operate the file. As shown in FIG. 7B, a cursor 730 may select the tab 750, and as further shown in FIG. 7C, drag and drop it to a position corresponding to the tab 720. The files corresponding to the tabs 710, 720, and 750, in the order as shown in FIG. 7A, are rearranged to correspond to the order of the tabs 710, 750, and 720 as shown in FIG. 7D.

An exemplary method of saving a group of computer files will now be disclosed.

Figure 8A:
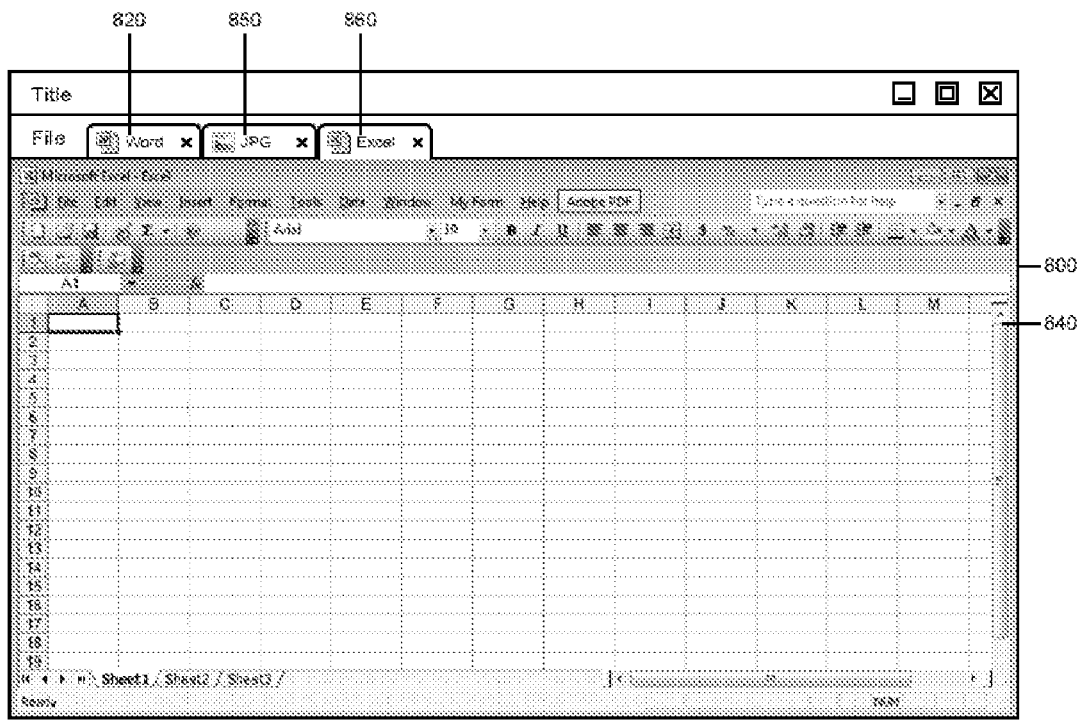
FIG. 8A through 8D are diagrams illustrating an exemplary method of saving a computer file group into a computer file group file.

FIG. 8A illustrates an exemplary application software 800 with three computer files as indicated by tabs 820, 850, and 860. As shown, the file corresponding to the tab 860, along with the corresponding application software, for example, Microsoft® Excel®, is displayed in a display area 840 of the application software 800.

Figure 8B:
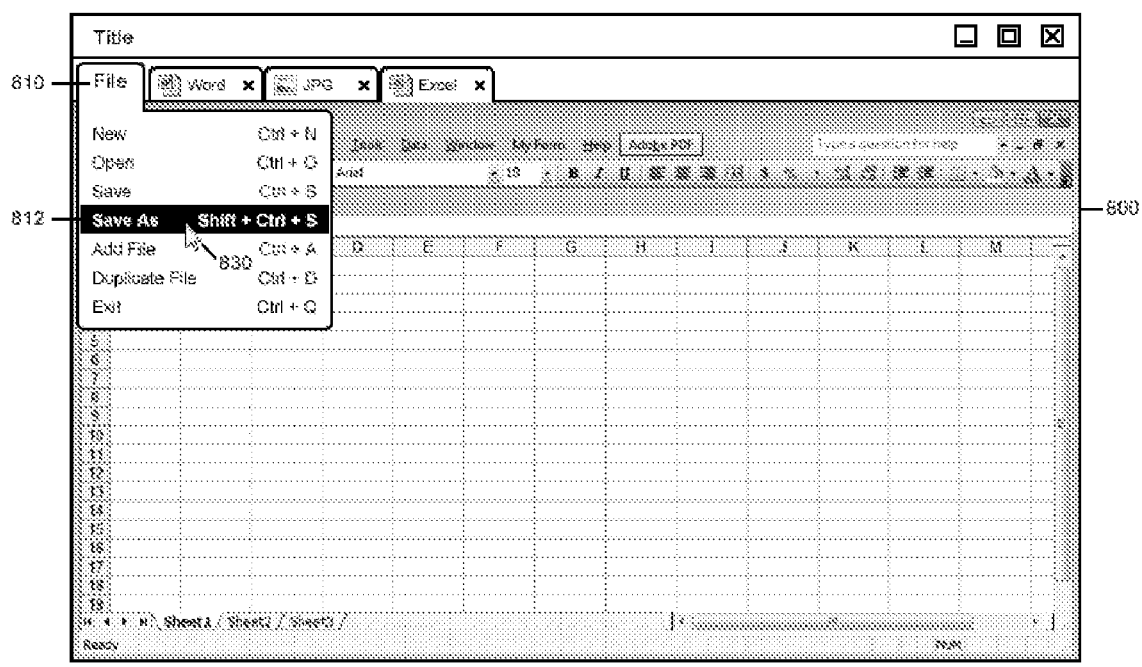
Figure 8C:
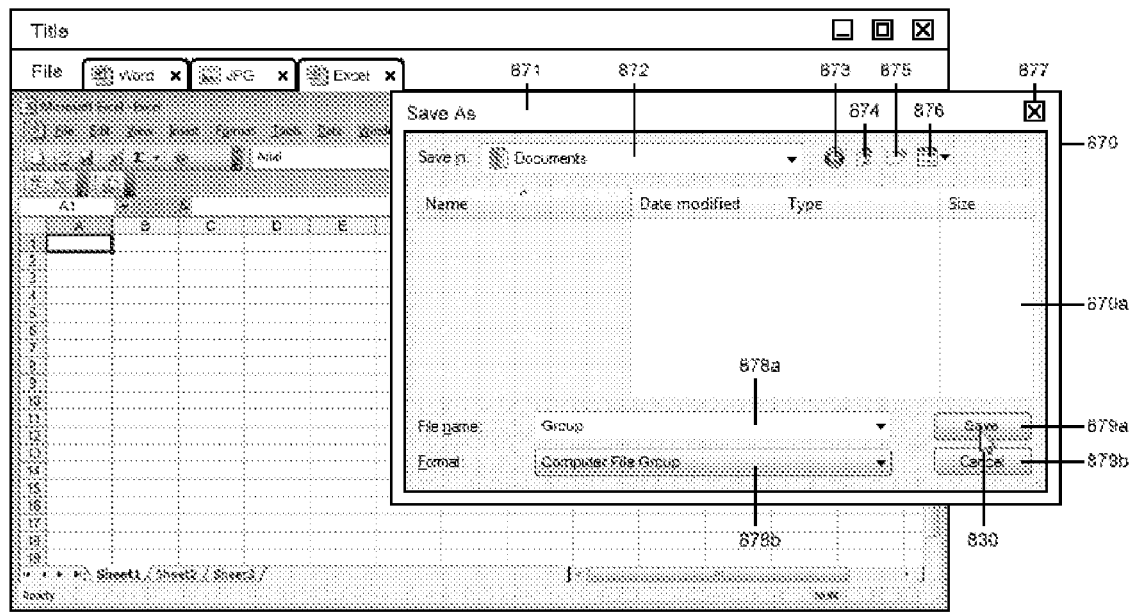
Figure 8D:
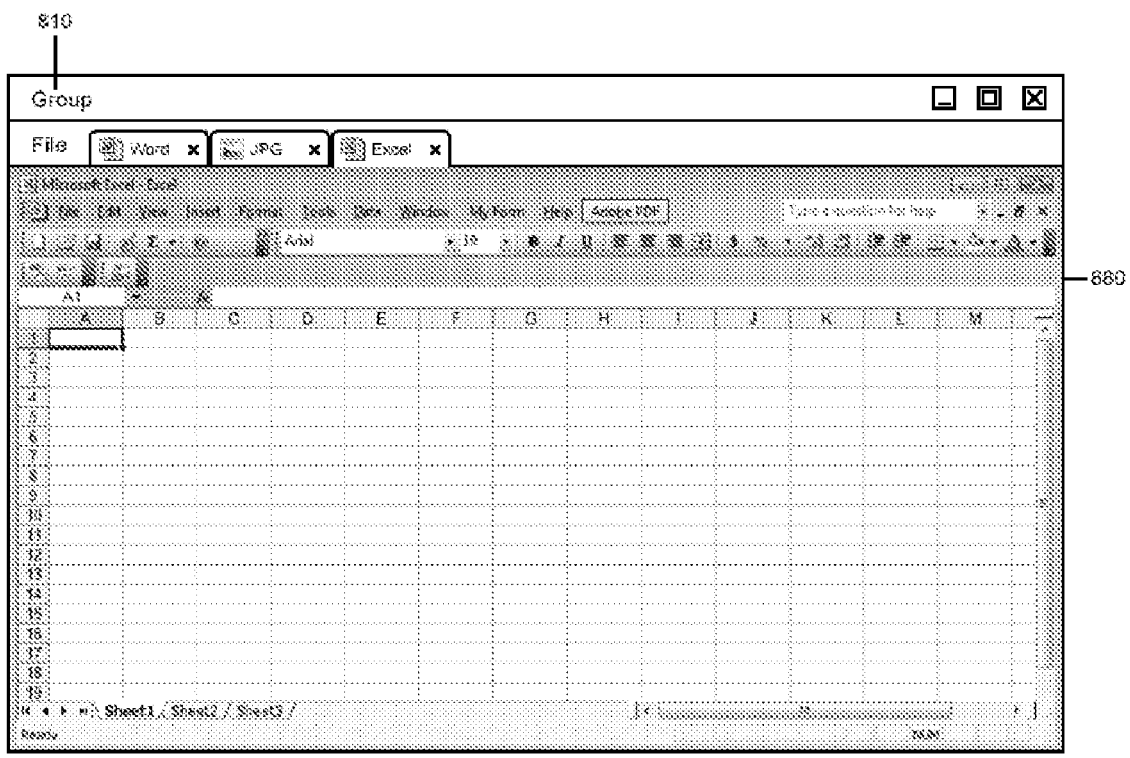

As shown in FIG. 8B, a user may control a cursor 830 to select "File" 810 and thereafter select "Save As" 812 from a drop down corresponding to the "File" 810. FIG. 8C illustrates "Save As" dialog box 870 corresponding to the "Save As" 812 of FIG. 8B. For example, the "Save As" dialog box 870 comprises a title bar 871 with meaningful information including a close button 877 which closes the "Save As" dialog box 870, a text drop down box 872 which shows a location where the user may save a file or data corresponding to the group of computer files, a button 873 which allows the user to navigate back, a button 874 which allows the user to go up a level in a directory, a button 875 which creates a new folder (or directory) in the current directory the user is looking at, a drop down 876 to expose viewing options of, for example, Thumbnail, Tiles, Icons, List and Details, and a viewing window 870a of the "Save As" dialog box 870. Also provided are a text drop down 878a where the user may type in the file name to name the group of computer files, and a drop down 878b to control or indicate the type of file format to save the group of computer files as. For example, a file format "Computer File Group" may be provided as a default file format for the group of computer files. Buttons 879a and 879b may be further provided to save or cancel the file save operation. FIG. 8D illustrates that a title bar 880 of the application software 800 which indicates "Group" as the saved file name for the group of computer files.

An exemplary method of opening a group of computer files will now be described.

Figure 9A:
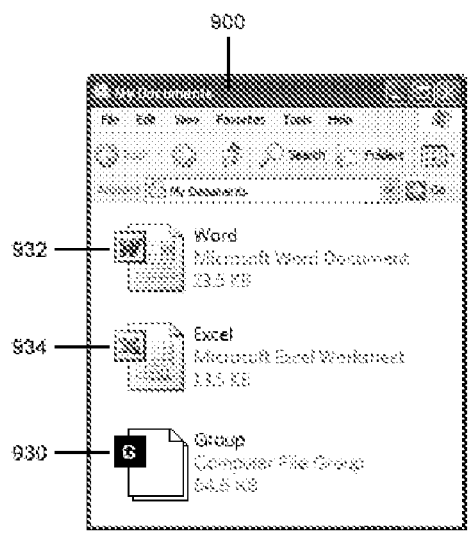
FIG. 9A through 9C are diagrams illustrating an exemplary method of opening an existing computer file group file by double clicking on a computer file group file from an operating system directory, such as Microsoft® Windows®.
Figure 9B:
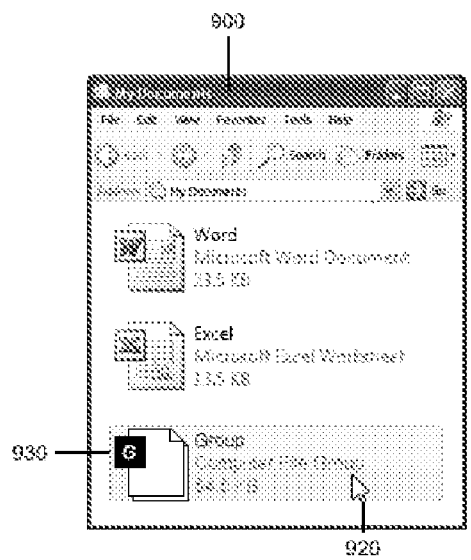

FIG. 9A illustrates an exemplary computer operating system directory 900, for example, Microsoft® Windows®, which displays two computer files 932 and 934 associated with Microsoft® Word® and Microsoft® Excel®, respectively, and a group of computer files 930. FIG. 9B shows a cursor 920 placed over the group of computer files 930. For example, by double clicking the group of computer files 930, multiple files of the group of computer files 930, and multiple application software to operate the multiple files may be opened.

Figure 9C:
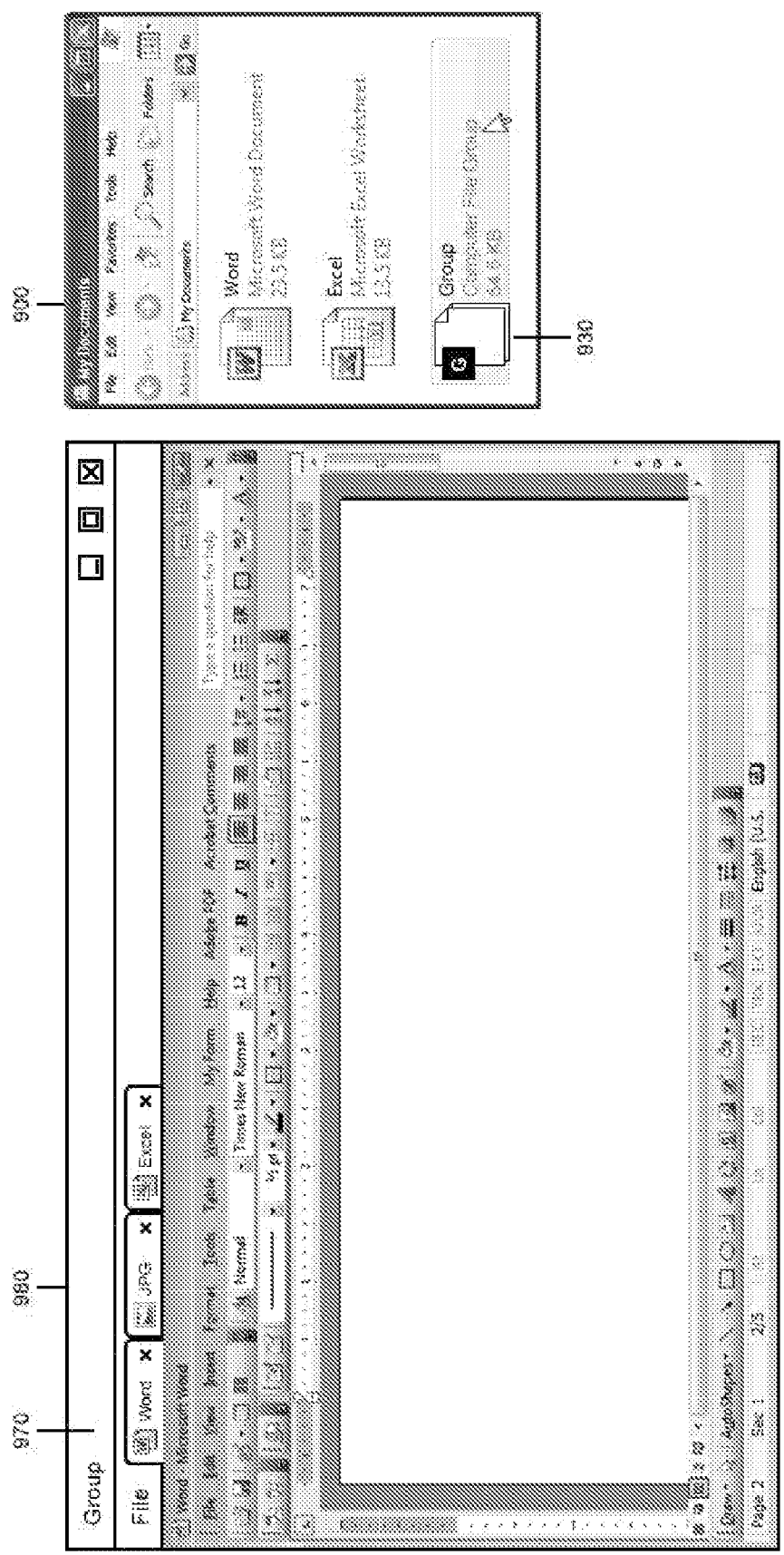

FIG. 9C illustrates an exemplary application software 980 hosting the multiple files corresponding to the group of computer files 930 of the directory 900. A title bar 970 indicates the name of the group of computer files 930 as "Group."

Figure 10A:
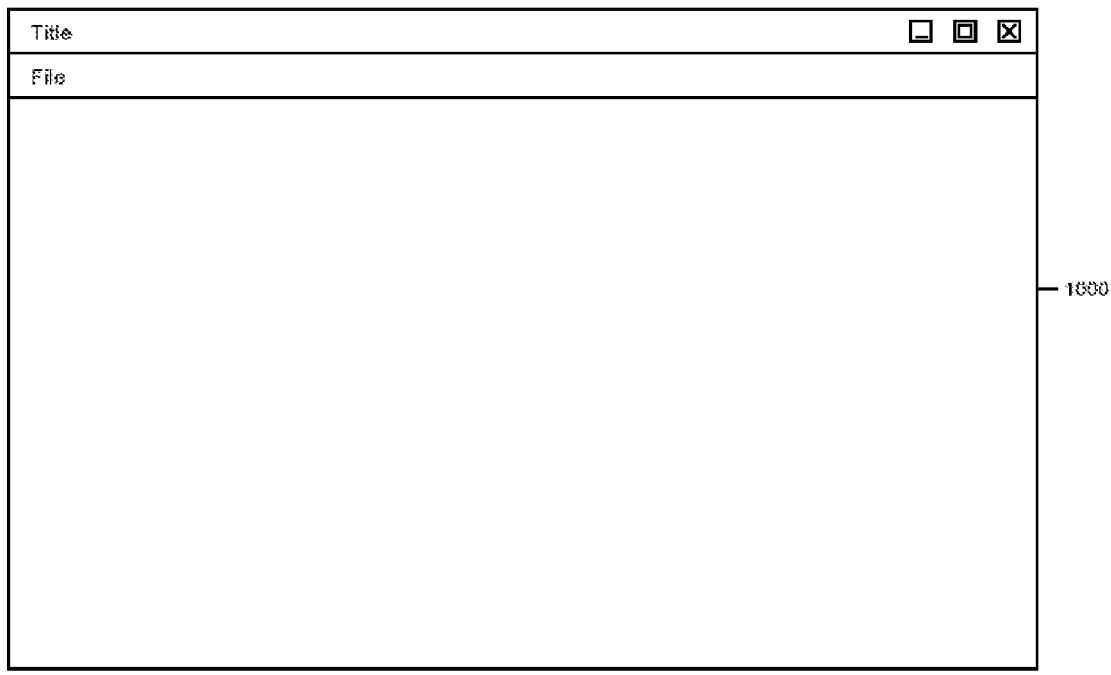
FIG. 10A through 10D are diagrams illustrating an exemplary method of opening an existing computer file group file by using an "Open" from a "File" drop down in a computer file group application software.
Figure 10B:
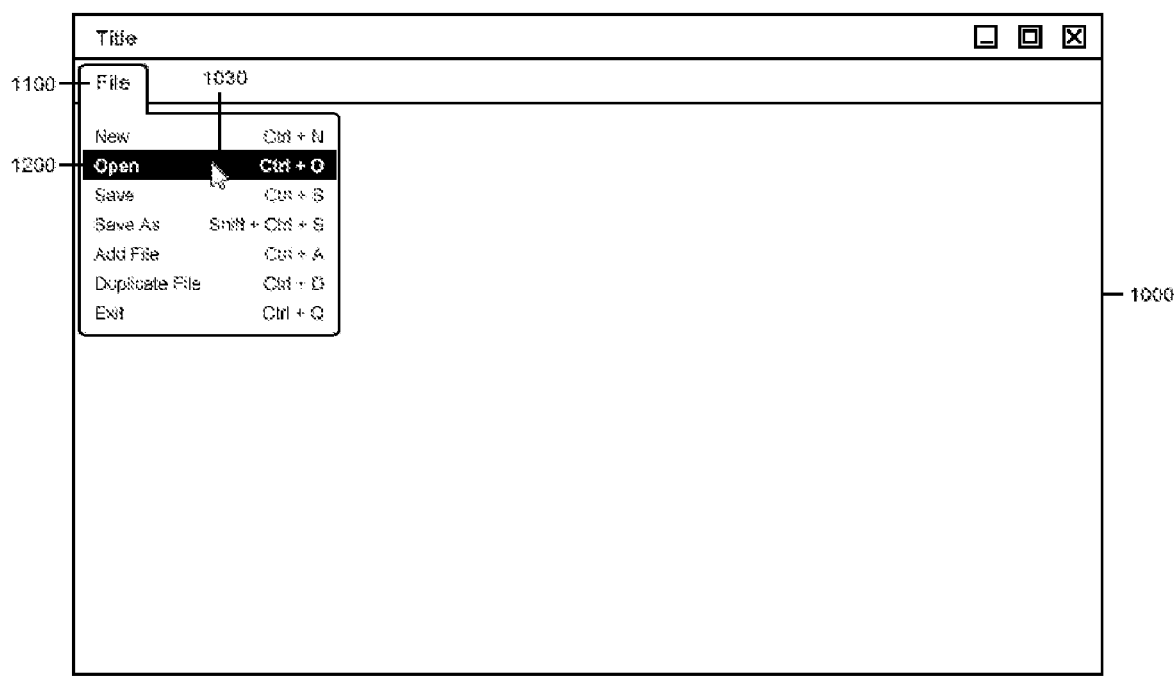
Figure 10C:
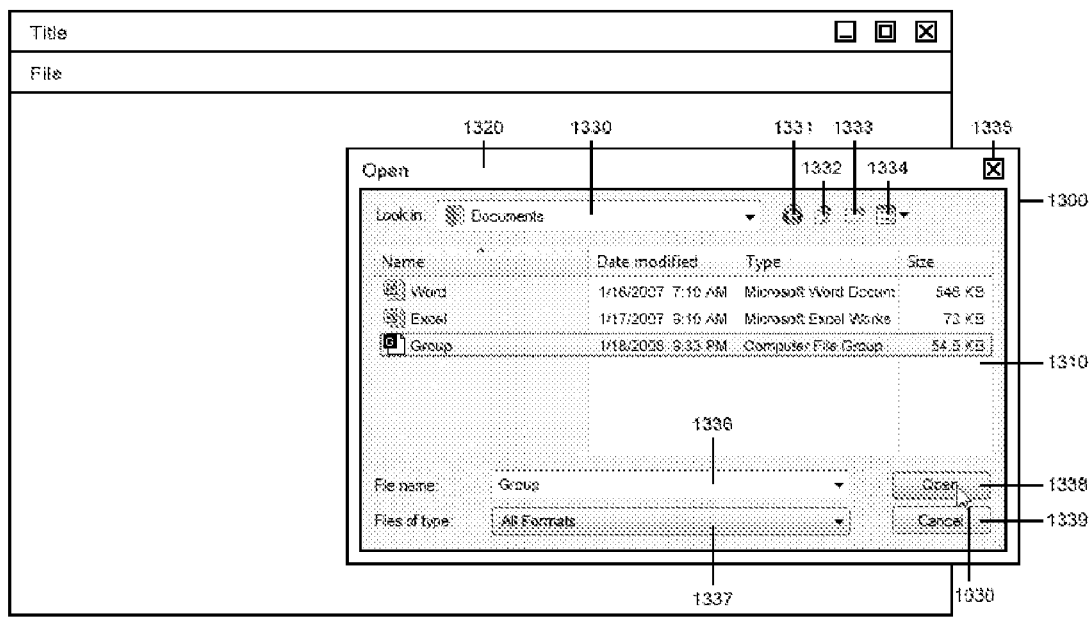

FIGS. 10A through 10D illustrate another exemplary method of opening a group of computer files. FIG. 10A illustrates an exemplary default view of an application software 1000 to open a group of computer files. FIG. 10B illustrates a "File" button or tab 1100 of the application software 1000 and the corresponding drop down. As shown in FIG. 10B, using a cursor 1030, a user may select "Open" 1200 from the drop down to bring up an "Open" dialog box 1300 as shown in FIG. 10C. For example, FIG. 10C illustrates that the "Open" dialog box 1300 comprises a title bar 1320 with meaningful information including a close button 1335 to close the "Open" dialog box 1300, a text drop down box 1330 which shows a location of a directory to open files from, a button 1331 which allows a user to navigate back, a button 1332 which allows the user to go up a level in the directory, a button 1333 to creates a new folder (or directory) in the current directory the user is looking at, and a drop down 1334 to expose the viewing options of Thumbnail, Tiles, Icons, List and Details. The "Open" dialog box 1300 may further comprise a viewing window 1310 to display files in a directory, a text drop down box 1336 to display the file name of a file selected to open, and a drop down 1337 which controls what type of file formats to display in the viewing window 1310. A default may be set to "All Formats" to shows all computer file types in that directory. The "Open" dialog box 1300 may further comprise buttons 1338 and 1339 to open the selected file and cancel the "Open" dialog box 1300, respectively.

Figure 10D:
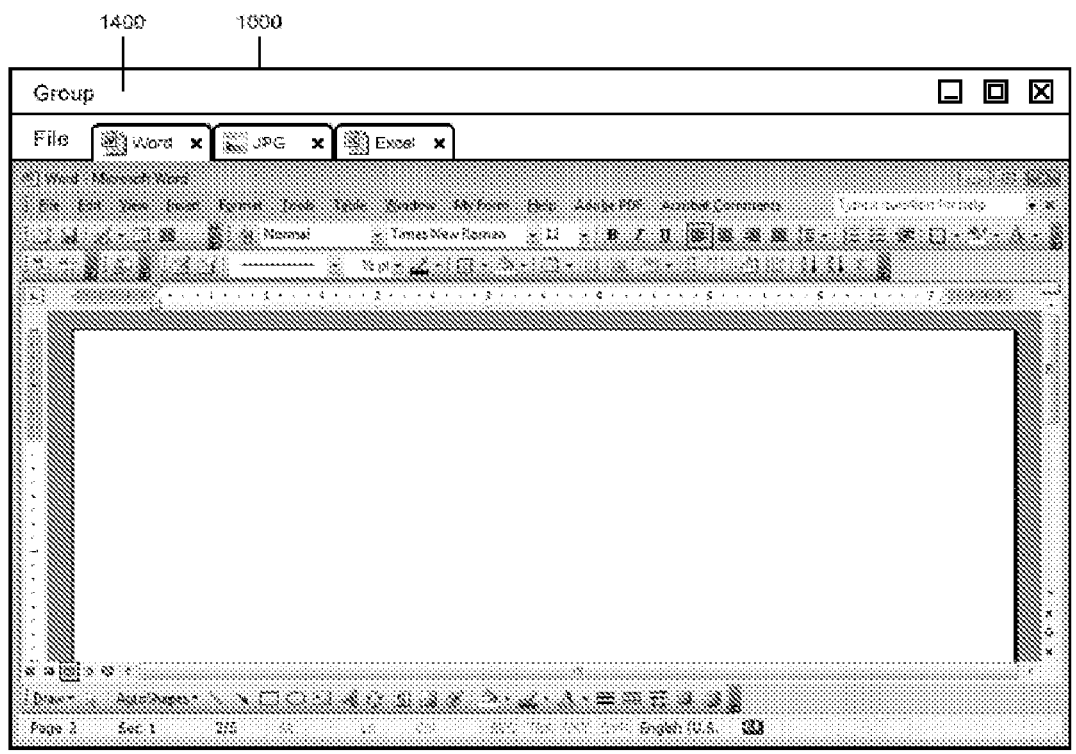

FIG. 10D illustrates the application system 1000 hosting multiple files corresponding to a group of computer files, for example, corresponding to a file opened in an "Open" dialog box. A title bar 1400 indicates the name of the group of computer files as "Group."

Accordingly, a computer file grouping system is provided where computer files are linked and viewable in a single container to reduce complexity of organization. By linking individual computer files into groupings, one or more users are allowed view multiple computer files and one or more application software corresponding to the computer files, in a single container. Accordingly, one or more users may view, edit, save, delete, and add multiple computer files in the single container. By grouping individual computer files, one or more users may easily open one computer file group to open multiple computer files and application software associated with the individual computer files. While an application software hosting may display multiple files grouped in a computer file group, it is understood that opening the computer file group may result in opening an individual file and application software corresponding to the individual file currently being displayed in the hosting application software.

FIG. 11 illustrates a method in a computer system for grouping computer files in a computer files group according to an exemplary embodiment.

In operation 2000, a computer 3000 storing a program to group the computer files in the computer file group adds a first computer file selected by a user to the computer file group. It is understood that functional programs, codes, and code segments to accomplish the exemplary embodiment can be easily construed by programmers skilled in the art. It is also understood that, as an illustration only, a computer 3000 may be a network computer, a personal desktop computer, a portable lab-top computer, and a hand-held devices such as PDAs and personal multimedia players, capable of running a plurality of application software or utilizing application software stored in another computer or elsewhere, and storing therein or capable of utilizing a program stored in another computer or elsewhere, that groups computer files in a computer files group.

In operation 2200, the computer 3000 adds a second computer file selected by the user to the computer file group.

In operation 2400, the computer 3000 creates a file corresponding to the computer file group to open the first and second computer files and application software to operate the individual first and second computer files.

According to an aspect, opening the created file corresponding to the computer file group opens all the individual first and second computer files associated with the computer file group and the corresponding application software that are associated with the individual first and second computer files.

In operation 2600, the computer may further display a window displaying, for example, the first computer file as a currently displayed file and first and second tabs corresponding to the first and second computer files, and display, for example, the second computer file as the currently displayed file in response to the second tab being selected by the user.

According to certain embodiment described above, an exemplary computer file group may be created by using application software according to an exemplary embodiment. It is understood that exemplary application software to create a computer file group may be provided as add-on software or as a part or feature of another application software such as, for example, Microsoft® Word®.

The above-described exemplary method(s) may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method in a computer system for grouping computer files in a computer file group, the method comprising:

adding a first computer file selected by a user along with first software for executing the first computer file to the computer file group, the first computer file comprising a file type from among a word processing file, a spreadsheet file, and a photo;

displaying the first computer file;

adding a second computer file selected by the user along with second software for executing the second computer file to the computer file group by dragging an icon corresponding to the second computer file and dropping it over the displayed first computer file that is executed by the first software, the second computer file comprising a file type different from the first file type from among the word processing file, the spreadsheet file, and the photo; and in response to the second computer file being dropped over the displayed first computer file, displaying a window that comprises the second computer file as a currently displayed file and first and second tabs corresponding to the first and second computer files, respectively, such that if the user selects the first tab the first computer file becomes the currently displayed file in the window.

2. The method as claimed in claim 1, wherein:

opening the file opens the first and second computer files and the first and second software that are associated with the first and second computer files to operate the first and second computer files.

3. The method as claimed in claim 2, further comprising:

displaying the second computer file as the currently displayed file in response to the second tab being selected by the user.

4. The method as claimed in claim 1, further comprising adding the first computer file selected by the user to another computer file group, wherein in response to updating the first computer file in the computer file group, the updated first computer file is provided in response to opening a file corresponding to the another computer file group.

5. The method as claimed in claim 4, wherein in response to further updating the first computer file in the other computer file group, the further updated first computer file is provided in response to opening the file corresponding to the computer file group.

6. The method as claimed in claim 1, wherein opening the created file corresponding to the computer file group opens all the individual first and second computer files associated with the computer file group and the corresponding software that is associated with the individual first and second computer files.

7. The method of claim 1, wherein the first computer file is one of a MICROSOFT® WORD file, a MICROSOFT® EXCEL file, and an ADOBE PHOTOSHOP® file, and the second computer file is of a different type than the first computer file and is one of MICROSOFT® WORD file, a MICROSOFT® EXCEL file, and an ADOBE PHOTOSHOP® file different from the first computer file.

8. A computer-readable storage medium storing a program to group computer files in a computer file group, comprising instructions to cause a computer to:

add a first computer file selected by a user along with first software for executing the first computer file to the computer file group, the first computer file comprising a file type from among a word processing file, a spreadsheet file, and a photo;

display the first computer file;

add a second computer file selected by the user along with second software for executing the second computer file to the computer file group by dragging an icon corresponding to the second computer file and dropping it over the displayed first computer file that is executed by the first software, the second computer file comprising a file type different from the first file type from among the word processing file, the spreadsheet file, and the photo; and in response to the second computer file being dropped over the displayed first computer file, display a window that comprises the second computer file as a currently displayed file and first and second tabs corresponding to the first and second computer files, respectively, such that if the user selects the first tab the first computer file becomes the currently displayed file in the window.

9. The computer-readable storage medium as claimed in claim 8, wherein:

opening the file opens the first and second computer files and the first and second software that are associated with the first and second computer files to operate the first and second computer files.

10. The computer-readable storage medium as claimed in claim 9, further comprising instructions to cause the computer to:

display the second computer file as the currently displayed file in response to the second tab being selected by the user.

11. The computer-readable storage medium as claimed in claim 8, further comprising an instruction to cause the computer to add the first computer file selected by the user to another computer file group, wherein in response to updating the first computer file in the computer file group, the updated first computer file is provided in response to opening a file corresponding to the another computer file group.

12. The computer-readable storage medium as claimed in claim 11, wherein in response to further updating the first computer file in the other computer file group, the further updated first computer file is provided in response to opening the file corresponding to the computer file group.

13. The computer-readable storage medium as claimed in claim 8, wherein opening the created file corresponding to the computer file group opens all the individual first and second computer files associated with the computer file group and the corresponding software that is associated with the individual first and second computer files.

14. The computer-readable storage medium of claim 8, wherein the first computer file is one of a MICROSOFT® WORD file, a MICROSOFT® EXCEL file, and an ADOBE PHOTOSHOP® file, and the second computer file is of a different type than the first computer file and is one of MICROSOFT® WORD file, a MICROSOFT® EXCEL file, and an ADOBE PHOTOSHOP® file different from the first computer file.

* * * * *